(12) United States Patent
Nagatani et al.

(10) Patent No.: US 11,714,342 B2
(45) Date of Patent: Aug. 1, 2023

(54) PROJECTOR HAVING A COOLING DEVICE

(71) Applicant: SEIKO EPSON CORPORATION, Tokyo (JP)

(72) Inventors: Kaname Nagatani, Matsumoto (JP); Osamu Katsuda, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/206,278

(22) Filed: Mar. 19, 2021

(65) Prior Publication Data
US 2021/0294189 A1    Sep. 23, 2021

(30) Foreign Application Priority Data

Mar. 19, 2020 (JP) ................................. 2020-048803

(51) Int. Cl.
*G03B 21/16* (2006.01)
*H04N 9/31* (2006.01)

(52) U.S. Cl.
CPC ........... *G03B 21/16* (2013.01); *H04N 9/3144* (2013.01)

(58) Field of Classification Search
CPC .............................. G03B 21/16; H04N 9/3144
See application file for complete search history.

(56) References Cited

U.S. PATENT DOCUMENTS

| 6,428,170 B1 | 6/2002 | Haba |
| 9,261,761 B2 | 2/2016 | Kuriaki |
| 10,041,716 B2* | 8/2018 | Lee ........................ F25D 11/022 |
| 10,866,496 B1 | 12/2020 | Nagatani et al. |
| 2008/0236190 A1* | 10/2008 | Tsuchiya ................ G03B 21/16 62/468 |
| 2008/0236191 A1* | 10/2008 | Tsuchiya ................. F25D 21/14 62/498 |
| 2010/0302463 A1* | 12/2010 | Matsumoto .......... H04N 9/3144 348/744 |
| 2011/0032489 A1* | 2/2011 | Kimoto ................ H04N 9/3144 353/56 |
| 2011/0037954 A1* | 2/2011 | Tsuchiya ................ G03B 21/16 353/54 |

(Continued)

FOREIGN PATENT DOCUMENTS

| JP | 2000-298311 | 10/2000 |
| JP | 2007-087765 A | 4/2007 |

(Continued)

*Primary Examiner* — Bao-Luan Q Le
(74) *Attorney, Agent, or Firm* — Dority & Manning, P.A.

(57) ABSTRACT

A projector includes a first cooling target and a cooling device. The cooling device includes a first compressor configured to compress working fluid in a gas phase, a condenser configured to condense the working fluid in the gas phase into the working fluid in a liquid phase, a first expander configured to decompress the working fluid in the liquid phase, a first evaporator configured to change the working fluid flowed from the first expander to the working fluid in the gas phase with heat of a first cooling target and discharge the changed gas-phase working fluid to the first compressor, a first pipe connecting the first compressor and the condenser, a second pipe connecting the condenser and the first expander, and a base to which the first compressor, the condenser, and the first expander are fixed. The first pipe and the second pipe are provided in the base.

6 Claims, 7 Drawing Sheets

(56) References Cited

U.S. PATENT DOCUMENTS

| | | | | |
|---|---|---|---|---|
| 2011/0211166 A1* | 9/2011 | Kawano | | G03B 21/16 353/20 |
| 2012/0023978 A1* | 2/2012 | Chae | | F25B 31/004 62/115 |
| 2012/0023980 A1* | 2/2012 | Lee | | F25B 49/022 62/115 |
| 2012/0023981 A1* | 2/2012 | Chae | | F25B 1/10 62/115 |
| 2012/0111037 A1 | 5/2012 | Campell et al. | | |
| 2012/0312034 A1* | 12/2012 | Oh | | F25B 31/004 62/84 |
| 2013/0340454 A1* | 12/2013 | Kim | | F25B 1/10 62/126 |
| 2015/0040591 A1* | 2/2015 | Lim | | F25B 49/02 62/118 |
| 2015/0198869 A1* | 7/2015 | Kuriaki | | G03B 21/005 353/31 |
| 2016/0215771 A1* | 7/2016 | Hu | | F25B 1/02 |
| 2016/0356537 A1* | 12/2016 | Chae | | F25B 1/10 |
| 2017/0219254 A1* | 8/2017 | Sul | | F25D 21/12 |
| 2019/0168582 A1* | 6/2019 | Sun | | F28D 1/0443 |
| 2020/0296859 A1* | 9/2020 | Takagi | | F25B 39/022 |

FOREIGN PATENT DOCUMENTS

| | | |
|---|---|---|
| JP | 2009-122385 | 12/2009 |
| JP | 2010-072592 A | 4/2010 |
| JP | 2015-132659 A | 7/2015 |
| JP | 2019-174721 A | 10/2019 |
| JP | 2021-032955 | 3/2021 |

* cited by examiner

PROJECTOR HAVING A COOLING DEVICE

The present application is based on, and claims priority from JP Application Serial Number 2020-048803, filed Mar. 19, 2020, the disclosure of which is hereby incorporated by reference herein in its entirety.

BACKGROUND

1. Technical Field

The present disclosure relates to a projector.

2. Related Art

There has been known a projector including an indoor unit that is disposed inside a room and projects a video and an outdoor unit that is disposed outside the room (see, for example, JP-A-2015-132659 (Patent Literature 1)).

In the projector described in Patent Literature 1, the indoor unit includes R, G, and B laser clusters, an optical combining section, and a projection lens and includes R, G, and B laser heat sinks, a first refrigerant pipe, a drain pipe, and an electronic expansion valve. The outdoor unit includes a second refrigerant pipe, a cooling device, and a refrigerant heating heater. Between the indoor unit and the outdoor unit, a refrigerant pipe connecting one end of the first refrigerant pipe and one end of the second refrigerant pipe and connecting the other end of the first refrigerant pipe and the other end of the second refrigerant pipe and a communication line are disposed.

In the projector, the electronic expansion valve, the G laser heat sink, the B laser heat sink, and the R laser heat sink are connected in series in this order via the first refrigerant pipe.

The second refrigerant pipe and the first refrigerant pipe form an annular refrigerant path via the refrigerant pipe. refrigerant circulates in the order of one end of the electronic expansion valve, the laser heat sinks, the refrigerant heating heater, a refrigerant compressor and a condenser of the cooling device, and the other end of the electronic expansion valve.

The refrigerant compressor compresses a refrigerant gas to thereby raise the refrigerant gas in temperature and pressure. The condenser exchanges the heat of the refrigerant gas raised in temperature and pressure with the heat of outdoor air caused to flow into the outdoor unit from the outside the outdoor unit by a fan to thereby change the refrigerant gas to high-pressure liquid refrigerant.

The electronic expansion valve decompresses the high-pressure liquid refrigerant and changes the high-pressure liquid refrigerant to liquid refrigerant that easily vaporizes. The electronic expansion valve controls a decompression amount of the refrigerant in the first refrigerant pipe to thereby control an evaporation temperature of the refrigerant and cool the laser heat sinks with a latent heat effect of the refrigerant.

When the refrigerant flows into the refrigerant compressor in a state in which the refrigerant is not completely vaporized, an adverse effect occurs in the refrigerant compressor. Therefore, the refrigerant to be caused to flow into the refrigerant compressor is heated by the refrigerant heating heater.

With the configuration explained above, the temperature of the laser heat sinks and the like is kept constant by the latent heat effect of the refrigerant in a portion from one end of the electronic expansion valve to the laser heat sinks and the refrigerant heating heater in the refrigerant path. In this way, the cooling device is capable of cooling the laser heat sinks and the R, G, and B laser clusters to a certain constant temperature via the refrigerant circulating in the refrigerant path.

However, since the projector described in Patent Literature 1 includes the outdoor unit connected to the indoor unit via the refrigerant pipe and the communication line, it is complicated to set the projector.

SUMMARY

A projector according to an aspect of the present disclosure modulates and projects light emitted from a light source, and the projector includes: a first cooling target; a cooling device configured to cool the first cooling target; and an exterior housing accommodating the first cooling target and the cooling device. The cooling device includes: a first compressor configured to compress working fluid in a gas phase; a condenser connected to the first compressor and configured to condense the working fluid in the gas phase compressed by the first compressor into the working fluid in a liquid phase; a first expander connected to the condenser and configured to decompress the working fluid in the liquid phase condensed by the condenser and change the working fluid in the liquid phase to the working fluid in a mixed phase of the liquid phase and the gas phase; a first evaporator connected to the first expander and configured to change the working fluid flowed from the first expander to the working fluid in the gas phase with heat transferred from the first cooling target and discharge the changed gas-phase working fluid to the first compressor; a first pipe connecting the first compressor and the condenser; a second pipe connecting the condenser and the first expander; and a base to which the first compressor, the condenser, and the first expander are fixed. The first pipe and the second pipe are provided in the base.

DESCRIPTION OF EXEMPLARY EMBODIMENTS

First Embodiment

Figure 1:
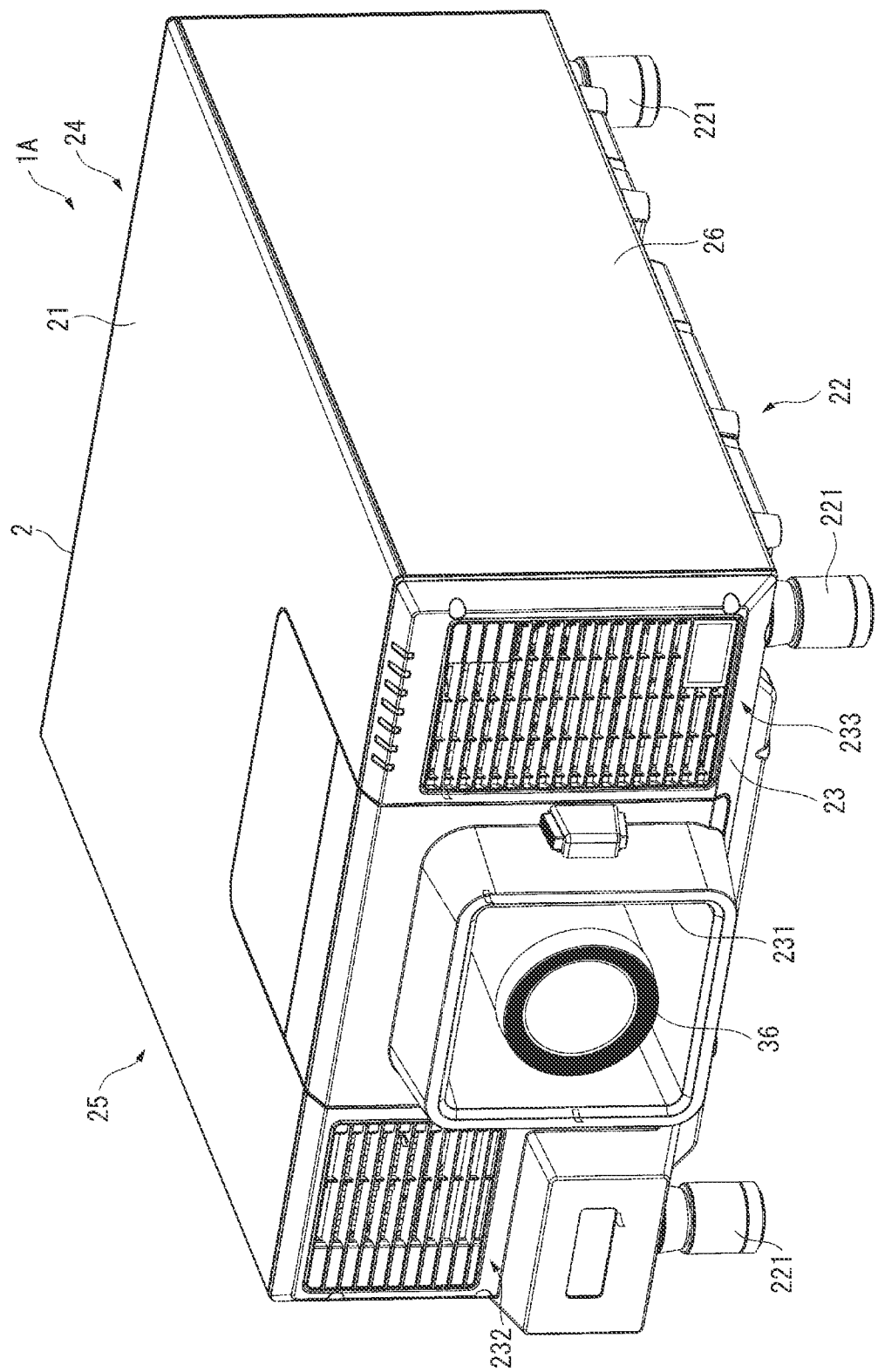
FIG. 1 is a perspective view showing the exterior of a projector in a first embodiment.

A first embodiment of the present disclosure is explained below with reference to the drawings.
Schematic Configuration of a Projector FIG. 1 is a perspective view showing the exterior of a projector 1A according to this embodiment.

The projector 1A according to this embodiment is an image display apparatus that modulates light emitted from a light source, forms an image corresponding to image information, and enlarges and projects the formed image onto a projection surface such as a screen. As shown in FIG. 1, the projector 1A includes an exterior housing 2 configuring the exterior of the projector 1A.

Configuration of the Exterior Housing

The exterior housing 2 includes a top surface section 21, a bottom surface section 22, a front surface section 23, a rear surface section 24, a left side surface section 25, and a right side surface section 26 and is formed in a substantially rectangular parallelepiped shape.

The bottom surface section 22 includes a plurality of leg sections 221 that are in contact with a setting surface on which the projector 1A is placed.

The front surface section 23 is located on an image projection side in the exterior housing 2. The front surface section 23 includes an opening section 231 that exposes a part of a projection optical device 36 explained below. An image projected by the projection optical device 36 passes through the opening section 231. The front surface section 23 includes an exhaust port 232 and an introduction port 233 in positions across the opening section 231. The exhaust port 232 is located on the left side surface section 25 side in the front surface section 23 and discharges a cooling gas, which has cooled a cooling target in the projector 1A, to the outside of the exterior housing 2. The introduction port 233 is located on the right side surface section 26 side in the front surface section 23 and introduces gas such as air on the outside of the exterior housing 2 into the inside of the exterior housing 2 as the cooling gas.

Internal Configuration of the Projector

Figure 2:
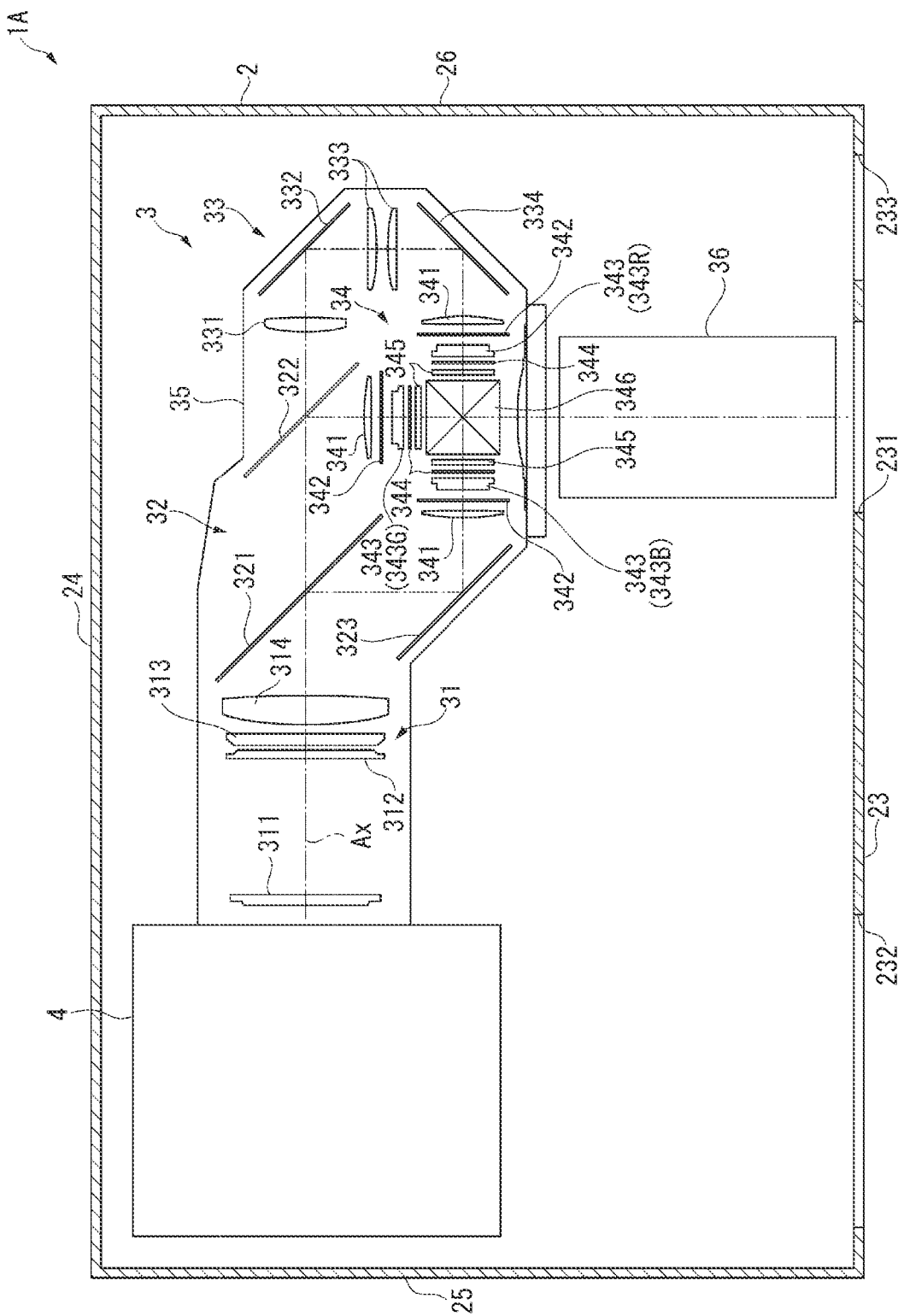
FIG. 2 is a schematic diagram showing an internal configuration of the projector in the first embodiment.

FIG. 2 is a schematic diagram showing an internal configuration of the projector 1A.

As shown in FIG. 2, the projector 1A further includes an image projecting device 3 housed in the exterior housing 2. Besides, although not shown in FIG. 2, the projector 1A includes a cooling target, a cooling device 5 (see FIG. 4) that cools the cooling target, a control device that controls the operation of the projector 1A, and a power supply device that supplies electric power to electronic components of the projector 1A.

Configuration of the Image Projecting Device

The image projecting device 3 forms an image corresponding to image information input from the control device and projects the formed image. The image projecting device 3 includes a light source device 4, an equalizing section 31, a color separating section 32, a relay section 33, an image forming section 34, a housing for optical components 35, and a projection optical device 36.

The light source device 4 emits illumination light. The configuration of the light source device 4 is explained in detail below.

The equalizing section 31 equalizes the illumination light emitted from the light source device 4. The equalized illumination light passes through the color separating section 32 and the relay section 33 and illuminates a modulation region of a light modulating device 343 explained below of the image forming section 34. The equalizing section 31 includes two lens arrays 311 and 312, a polarization conversion element 313, and a superimposing lens 314.

The color separating section 32 separates light made incident from the equalizing section 31 into color lights of red, green, and blue. The color separating section 32 includes two dichroic mirrors 321 and 322 and a reflection mirror 323 that reflects the blue light separated by the dichroic mirror 321.

The relay section 33 is provided on an optical path of the red light longer than optical paths of the other color lights and suppresses a loss of the red light. The relay section 33 includes an incident-side lens 331, a relay lens 333, and reflection mirrors 332 and 334. In this embodiment, the relay section 33 is provided on the optical path of the red light. However, not only this, but, for example, the color light having an optical path longer than optical paths of the other lights may be the blue light and the relay section 33 may be provided on the optical path of the blue light.

The image forming section 34 modulates the red, green, and blue lights made incident thereon and combines the modulated color lights to form an image. The image forming section 34 includes three field lenses 341, three incident-side polarizing plates 342, three light modulating devices 343, three viewing angle compensating plates 344, and three emission-side polarizing plates 345 provided according to the incident color lights and one color combining section 346.

The light modulating device 343 modulates, according to image information, light emitted from the light source device 4. The light modulating device 343 includes a light modulating device 343R for red light, a light modulating device 343G for green light, and a light modulating device 343B for blue light. In this embodiment, the light modulating device 343 is configured by a transmission-type liquid crystal panel. A liquid crystal light valve is configured by the incident-side polarizing plate 342, the light modulating device 343, and the emission-side polarizing plate 345.

The color combining section 346 combines the color lights modulated by the light modulating devices 343B, 343G, and 343R to form an image. In this embodiment, the color combining section 346 is configured by a cross dichroic prism. However, not only this, but the color combining section 346 can be configured by, for example, a plurality of dichroic mirrors.

The housing for optical components 35 houses the sections 31 to 34 on the inside. An illumination optical axis Ax, which is an optical axis in design, is set in the image projecting device 3. The housing for optical components 35 holds the sections 31 to 34 in predetermined positions on the illumination optical axis Ax. The light source device 4 and the projection optical device 36 are disposed in predetermined positions on the illumination optical axis Ax.

The projection optical device 36 is a projection lens that enlarges and projects an image made incident from the image forming section 34 onto the projection surface. That is, the projection optical device 36 projects light modulated by the light modulating devices 343B, 343G, and 343R. The projection optical device 36 is configured as, for example, a group lens in which a plurality of lenses are housed in a tubular lens barrel.

Configuration of the Light Source Device

Figure 3:
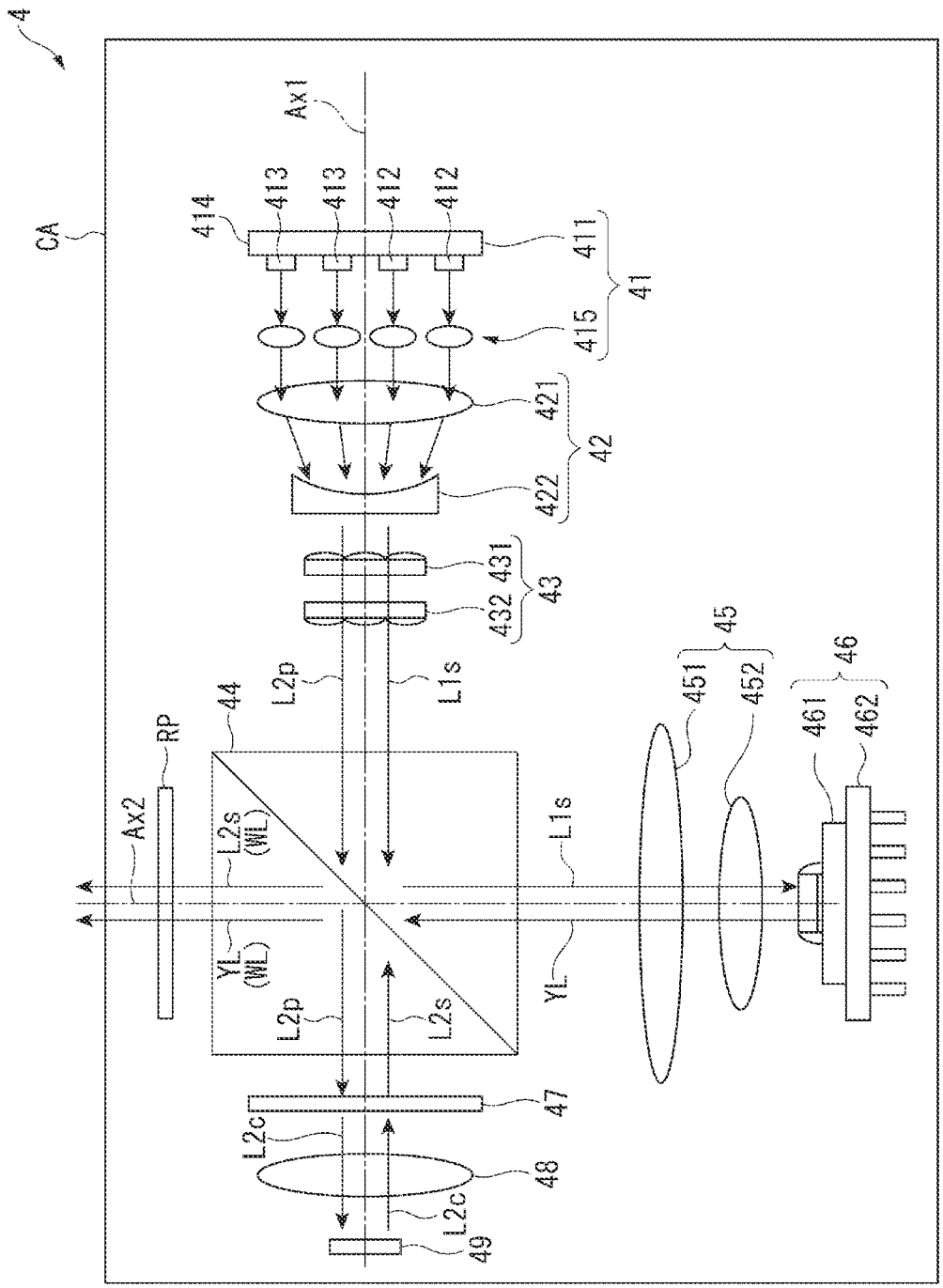
FIG. 3 is a schematic diagram showing the configuration of a light source device in the first embodiment.

FIG. 3 is a schematic diagram showing the configuration of the light source device 4.

The light source device 4 emits illumination light to the equalizing section 31. The light source device 4 includes, as shown in FIG. 3, a housing for light source CA and a light source section 41, an afocal optical element 42, a homogenizer optical element 43, a polarization separating element 44, a first condensing element 45, a wavelength conversion element 46, a first phase difference element 47, a second condensing element 48, a diffuse reflection section 49, and a second phase difference element RP housed in the housing for light source CA.

The housing for light source CA is configured as a sealed housing into which dust and the like less easily intrude.

The light source section 41, the afocal optical element 42, the homogenizer optical element 43, the polarization separating element 44, the first phase difference element 47, the second condensing element 48, and the diffuse reflection section 49 are disposed on an illumination optical axis Ax1 set in the light source device 4.

The wavelength conversion element 46, the first condensing element 45, the polarization separating element 44, and the second phase difference element RP are set in the light source device 4 and disposed on an illumination optical axis Ax2 orthogonal to the illumination optical axis Ax1. The illumination optical axis Ax2 coincides with the illumination optical axis Ax in the position of the lens array 311. In other words, the illumination optical axis Ax2 is set on an extended line of the illumination optical axis Ax.

Configuration of the Light Source Section

The light source section 41 includes a light source 411 that emits light and a collimator lens 415.

The light source 411 includes a plurality of first semiconductor lasers 412 and a plurality of second semiconductor lasers 413 and a supporting member 414.

The first semiconductor laser 412 emits s-polarized blue light L1s, which is excitation light. The blue light L1s is, for example, laser light, a peak wavelength of which is 440 nm. The blue light L1s emitted from the first semiconductor laser 412 is made incident on the wavelength conversion element 46.

The second semiconductor laser 413 emits p-polarized blue light L2p. The blue light L2p is, for example, laser light, a peak wavelength of which is 460 nm. The blue light L2p emitted from the second semiconductor laser 413 is made incident on the diffuse reflection section 49.

The supporting member 414 supports the plurality of first semiconductor lasers 412 and the plurality of second semiconductor lasers 413 respectively disposed in an array on a plane orthogonal to the illumination optical axis Ax1.

The blue light L1s emitted from the first semiconductor laser 412 and the blue light L2p emitted from the second semiconductor laser 413 are converted into parallel light beams by the collimator lens 415 and made incident on the afocal optical element 42.

In this embodiment, the light source 411 is configured to emit the s-polarized blue light L1s and the p-polarized blue light L2p. However, not only this, but the light source 411 may be configured to emit blue light, which is linearly polarized light having the same polarizing direction. In this case, a phase difference element that changes incident one kind of linearly polarized light to light including the s-polarized light and the p-polarized light only has to be disposed between the light source section 41 and the polarization separating element 44.

Configurations of the Afocal Optical Element and the Homogenizer Optical Element The afocal optical element 42 adjusts light beam diameter of the blue lights L1s and L2p made incident from the light source section 41 and makes the blue lights L1s and L2p incident on the homogenizer optical element 43. The afocal optical element 42 is configured by a lens 421 that condenses incident light and a lens 422 that collimates a light beam condensed by the lens 421.

The homogenizer optical element 43 equalizes illuminance distributions of the blue lights L1s and L2p. The homogenizer optical element 43 is configured by a pair of multi-lens arrays 431 and 432. A diffusing element that diffuses incident light may be provided instead of the homogenizer optical element 43.

Configuration of the Polarization Separating Element

The blue lights L1s and L2p passed through the homogenizer optical element 43 are made incident on the polarization separating element 44.

The polarization separating element 44 is a prism-type polarization beam splitter and separates an s-polarization component and a p-polarization component included in incident light. Specifically, the polarization separating element 44 reflects the s-polarization component and allows the p-polarization component to pass. The polarization separating element 44 has a color separation characteristic for causing light having a predetermined wavelength or more to pass irrespective of whether a polarization component is the x polarization component or the p-polarization component. Therefore, the s-polarized blue light L1s is reflected by the polarization separating element 44 and made incident on the first condensing element 45. On the other hand, the p-polarized blue light L2p passes through the polarization separating element 44 and is made incident on the first phase difference element 47.

Configuration of the First Condensing Element

The first condensing element 45 condenses the blue light L1s reflected by the polarization separating element 44 on the wavelength conversion element 46. The first condensing element 45 collimates fluorescent light YL made incident from the wavelength conversion element 46. In an example shown in FIG. 3, the first condensing element 45 is configured by two lenses 451 and 452. However, the number of lenses configuring the first condensing element 45 may be any number.

Configuration of the Wavelength Conversion Element

The wavelength conversion element 46 is excited by incident light, generates the fluorescent light YL, the wavelength of which is longer than the wavelength of the incident light, and emits the fluorescent light YL to the first condensing element 45. In other words, the wavelength conversion element 46 converts the wavelength of the incident light and emits converted light. The fluorescent light YL generated by the wavelength conversion element 46 is, for example, light, a peak wavelength of which is 500 to 700 nm. The wavelength conversion element 46 includes a wavelength converting section 461 and a heat radiating section 462.

Although not illustrated, the wavelength converting section 461 includes a wavelength conversion layer and a reflection layer. The wavelength conversion layer includes a phosphor that diffuses and emits the fluorescent light YL, which is nonpolarized light obtained by converting the wavelength of the incident blue light L1s. The reflection layer reflects the fluorescent light YL made incident from the wavelength conversion layer to the first condensing element 45 side.

The heat radiating section 462 is provided on a surface on the opposite side of a light incident side in the wavelength converting section 461 and radiates heat generated in the wavelength converting section 461.

The fluorescent light YL emitted from the wavelength conversion element 46 passes through the first condensing element 45 along the illumination optical axis Ax2 and is thereafter made incident on the polarization separating element 44 having the color separation characteristic explained above. The fluorescent light YL passes through the polarization separating element 44 along the illumination optical axis Ax2 and is made incident on the second phase difference element RP.

The wavelength conversion element 46 may be configured to be rotated around a rotation axis parallel to the illumination optical axis Ax2 by a rotating device such as a motor.

Configurations of the first phase difference element and the second condensing element The first phase difference element 47 is disposed between the polarization separating element 44 and the second condensing element 48. The first phase difference element 47 converts the blue light L2p passed through the polarization separating element 44 into circularly polarized blue light L2c. The blue light L2c is made incident on the second condensing element 48.

The second condensing element 48 condenses the blue light L2c made incident from the first phase difference element 47 on the diffuse reflection section 49. The second condensing element 48 collimates the blue light L2c made incident from the diffuse reflection section 49. The number of lenses configuring the second condensing element 48 can be changed as appropriate.

Configuration of the Diffuse Reflection Section

The diffuse reflection section 49 reflects and diffuses the incident blue light L2c at the same diffusion angle as a diffusion angle of the fluorescent light YL emitted from the wavelength conversion element 46. As the configuration of the diffuse reflection section 49, a configuration including a reflection plate that causes Lambertian reflectance of the incident blue light L2c and a rotating device that rotates the reflection plate around a rotation axis parallel to the illumination optical axis Ax1 can be illustrated.

The blue light L2c reflected by the diffuse reflection section 49 passes through the second condensing element 48 and is thereafter made incident on the first phase difference element 47. The blue light L2c is converted into a circularly polarized light, a rotating direction of which is the opposite direction, when being reflected by the diffuse reflection section 49. Accordingly, the blue light L2c made incident on the first phase difference element 47 via the second condensing element 48 is converted into s-polarized blue light L2s rather than p-polarized blue light L2p into which the blue light L2c is converted when the blue light L2c is made incident on the first phase difference element 47 from the polarization separating element 44. The blue light L2s is reflected by the polarization separating element 44 and made incident on the second phase difference element RP. That is, light made incident on the second phase difference element RP from the polarization separating element 44 is white light in which the blue light L2s and the fluorescent light YL are mixed.

Configuration of the Second Phase Difference Element

The second phaser difference element RP converts the white light made incident from the polarization separating element 44 into light in which the s-polarized light and the p-polarized light are mixed. White illumination light WL converted in this way is made incident on the equalizing section 31.

Configuration of the Cooling Device

Figure 4:
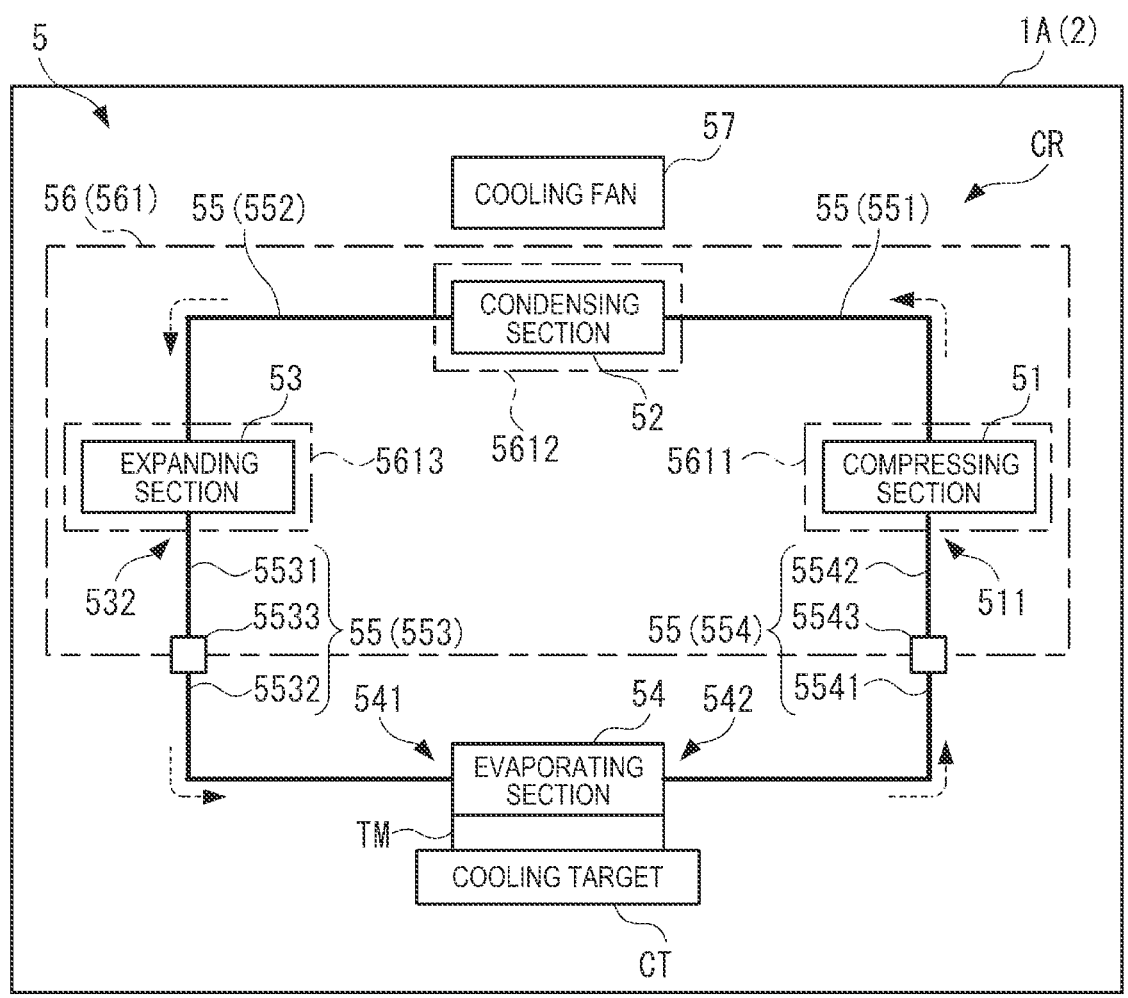
FIG. 4 is a schematic diagram showing the configuration of a cooling device in the first embodiment.

FIG. 4 is a schematic diagram showing the cooling device 5. In FIG. 4, a flowing direction of working fluid is indicated by dotted line arrows.

The cooling device 5 cools a cooling target CT configuring the projector 1A. Specifically, the cooling device 5 circulates working fluid, a phase of which changes between a liquid phase and a gas phase, and cools the cooling target CT, which is a first cooling target in the cooling device 5. The cooling target CT includes a light source 411, the wavelength conversion element 46, and a light modulating device 343. In this embodiment, the cooling target CT is the light source 411. As shown in FIG. 4, the cooling device 5 and the cooling target CT are housed in the exterior housing 2.

The cooling device 5 includes a compressor 51, a condenser 52, an expander 53, and an evaporator 54 and a plurality of pipes 55, a base 56, and a cooling fan 57.

Configuration of the Plurality of Pipes

The plurality of pipes 55 are tubular members annularly connecting the compressor 51, the condenser 52, the expander 53, and the evaporator 54. Working fluid flows the insides of the plurality of pipes 55. The plurality of pipes 55 include a first pipe 551, a second pipe 552, a third pipe 553, and a fourth pipe 554.

The first pipe 551 connects the compressor 51 and the condenser 52.

The second pipe 552 connects the condenser 52 and the expander 53.

The first pipe 551 and the second pipe 552 are formed of a material having relatively high strength against working fluid having relatively high pressure, for example, metal. The first pipe 551 and the second pipe 552 are provided in the base 56 explained below.

The third pipe 553 connects the expander 53 and the evaporator 54. The third pope 553 includes a first partial pipe 5531, a second partial pipe 5532, and a first coupler 5533.

The first partial pipe 5531 is equivalent to a first flow pipe in the cooling device 5. The first partial pipe 5531 is connected to an outflow part 532 from which the working fluid flows out in the expander 53. The first partial pipe 5531 is provided in the base 56 explained below.

The second partial pipe 5532 is equivalent to a first connection pipe in the cooling device 5. The second partial pipe 5532 is connected to an inflow part 541 into which the working fluid flows in the evaporator 54.

The first coupler 5533 separably couples the first partial pipe 5531 and the second partial pipe 5532 to each other. The first coupler 5533 can be configured by, for example, couplers provided in the first partial pipe 5531 and the second partial pipe 5532.

In the third pipe 553, the first partial pipe 5531 provided in the base 56 is formed of metal and the second partial pipe 5532 is formed of a material other than metal such as synthetic resin. However, not only this, but the entire third pipe 553 may be formed of metal or may be formed of a material other than metal.

The fourth pipe 554 connects the evaporator 54 and the compressor 51. The fourth pipe 554 includes a first partial pipe 5541, a second partial pipe 5542, and a second coupler 5543.

The first partial pipe 5541 is equivalent to a second connection pipe in the cooling device 5. The first partial pipe 5541 is connected to an outflow part 542 from which the working fluid flows out in the evaporator 54.

The second partial pipe 5542 is equivalent to a second flow pipe in the cooling device 5. The second partial pipe 5542 is connected to an inflow part 511 into which the working fluid flows in the compressor 51. The second partial pipe 5542 is provided in the base 56 explained below.

The second coupler 5543 separably couples the first partial pipe 5541 and the second partial pipe 5542 to each other. The second coupler 5543 can be configured by, for example, couplers provided in the first partial pipe 5541 and the second partial pipe 5542.

In the fourth pipe 554, the second partial pipe 5542 provided in the base 56 is formed of metal and the first partial pipe 5541 is formed of a material other than metal such as synthetic resin. However, not only this, but the entire fourth pipe 554 may be formed of metal or may be formed of a material other than metal.

Configuration of the Compressor

The compressor 51 is equivalent to a first compressor in the cooling device 5. The compressor 51 compresses the working fluid in the gas phase. That is, the compressor 51 raises the working fluid in the gas phase in temperature and pressure by compressing the working fluid in the gas phase flowing into the compressor 51 from the fourth pipe 554. The working fluid in the gas phase raised in temperature and pressure flows to the condenser 52 via the first pipe 551. The compressor 51 includes an inflow part 511 through which the working fluid flows into the inside from the second partial pipe 5542 of the fourth pipe 554. The inflow part 511 is connected to the second partial pipe 5542.

Configuration of the Condenser 52

The condenser 52 is connected to the compressor 51 via the first pipe 551. The condenser 52 condenses the working fluid in the gas phase compressed by the compressor 51, that is, the working fluid in the gas phase raised in temperature and pressure into the working fluid in the liquid phase. Specifically, the condenser 52 condenses the working fluid in the gas phase into the working fluid in the liquid phase by performing heat exchange between the compressed gas-phase working fluid and the cooling gas introduced into the inside from the outside of the exterior housing 2 and circulated to the condenser 52 by the cooling fan 57.

Configuration of the Expander

The expander 53 is equivalent to a first expander in the cooling device 5. The expander 53 is a decompressor and is connected to the condenser 52 via the second pipe 552. The working fluid in the liquid phase condensed by the condenser 52 flows into the expander 53.

The expander 53 decompresses the working fluid in the liquid phase condensed by the condenser 52 and changes a state of the working fluid to a mixed state of the liquid phase and the gas phase. That is, the expander 53 lowers the temperature of the working fluid. The expander 53 discharges the working fluid in the mixed state of the liquid phase and the gas phase to the evaporator 54 via the third pipe 553. The expander 53 includes an outflow part 532 through which the working fluid flows out from the inside to the first partial pipe 5531 of the third pipe 553. The outflow part 532 is connected to the first partial pipe 5531.

The expander 53 can be configured by, for example, an expansion valve, more specifically, an electronic expansion valve capable of controlling an evaporation temperature of the working fluid in the liquid phase and can be configured by a capillary tube.

Configuration of the Evaporator

The evaporator 54 is equivalent to a first evaporator in the cooling device 5. The evaporator 54 is connected to the expander 53 via the third pipe 553. The working fluid in the mixed state of the liquid phase and the gas phase flows into the evaporator 54 from the expander 53 via the third pipe 553. The evaporator 54 includes an inflow part 541 through which the working fluid flows into the inside of the evaporator 54 from the second partial pipe 5532 of the third pipe 553 and an outflow part 542 through which the working fluid flows out from the inside of the evaporator 54 to the first partial pipe 5541 of the fourth pipe 554. The inflow part 541 is connected to the second partial pipe 5532. The outflow part 542 is connected to the first partial pipe 5541.

The evaporator 54 is connected to the cooling target CT via a heat transferring member TM. The heat transferring member TM is a member made of metal having thermal conductivity. That is, the evaporator 54 is connected to the cooling target CT to be capable of transferring heat. The evaporator 54 evaporates, with heat transferred from the cooling target CT via the heat transferring member TM, the working fluid in the liquid phase flowing from the expander 53 to the evaporator 54 and changes the working fluid in the liquid phase to the working fluid in the gas phase. The evaporator 54 discharges the changed gas-phase working fluid to the compressor 51 via the fourth pipe 554. Consequently, the heat of the cooling target CT is consumed and the cooling target CT is cooled.

For example, when the cooling target CT is the light source 411, heat generated by the plurality of first semiconductor lasers 412 and the plurality of second semiconductor lasers 413 is transferred to the evaporator 54 via the supporting member 414 and the heat transferring member TM. The working fluid in the liquid phase is changed to the working fluid in the gas phase by the transferred heat, whereby the semiconductor lasers 412 and 413 are cooled. The same applies when the cooling target CT is the wavelength conversion element 46, the light modulating device 343, and the like. The heat transferring member TM may be absent.

As explained above, the cooling device 5 includes the circulation path CR for the working fluid that flows through the compressor 51, the first pipe 551, the condenser 52, the second pipe 552, the expander 53, the third pipe 553, the evaporator 54, and the fourth pipe 554 in order and flows into the compressor 51 again. The circulation path CR cools the cooling target CT.

Configuration of the Base

The base 56 is a member to which the compressor 51, the condenser 52, and the expander 53 are fixed and is a member including a part of the plurality of pipes 55. That is, the base 56 integrates the compressor 51, the condenser 52, the expander 53, and a part of the plurality of pipes 55.

The base 56 includes a base main body 561, the first pipe 551, the second pipe 552, the first partial pipe 5531, which is a first flow pipe, and the second partial pipe 5532, which is the second flow pipe.

The pipes including the first pipe 551, the second pipe 552, the first partial pipe 5531, and the second partial pipe 5532 provided in the base 56 include a form in which a part of the base main body 561 is formed as hollows and channels functioning as pipes are formed by the hollows. That is, the pipes provided in the base 56 may be formed by the base main body 561.

The pipes including the first pipe 551, the second pipe 552, the first partial pipe 5531, and the second partial pipe 5532 provided in the base 56 include a form in which pipes separate from the base main body 561 are fixed to the inside or the outside of the base main body 561. In this case, the entire the pipes provided in the base 56 may be fixed to the inside of the base main body 561 or at least a part of the pipes may be disposed to be exposed to the outside of the base main body 561.

The base main body 561 is configured by a material other than metal such as synthetic resin. In other words, in the base 56, at least a part of portions other than the first pipe 551 and the second pipe 552 is formed of a material other than metal. The base main body 561 includes a first fixing section 5611 to which the compressor 51 is fixed, a second fixing section 5612 to which the condenser 52 is fixed, and a third fixing section 5613 to which the expander 53 is fixed.

In this embodiment, the first pipe 551 and the second pipe 552 are provided on the inside of the base main body 561. The first pipe 551 and the second pipe 552 are pipes through which the high-pressure working fluid flows. That is, the pressure of the working fluid discharged from the compressor 51 and flowing into the expander 53 via the first pipe 551, the condenser 52, and the second pipe 552 is higher than the pressure of the working fluid discharged from the expander 53 and flowing into the compressor 51 via the evaporator 54. The compressor 51, the condenser 52, and the expander 53 on a high-pressure side are fixed to the base 56.

The first partial pipe 5531 of the third pipe 553 and the second partial pipe 5542 of the fourth pipe 554 are provided in the base main body 561.

The pressure of the working fluid flowing through the first partial pipe 5531 and the second partial pipe 5542 is not high compared with the pressure of the working fluid flowing through the first pipe 551 and the second pipe 552. Accordingly, unlike the first pipe 551 and the second pipe 552 through which the high-pressure working fluid flows, the first partial pipe 5531 and the second partial pipe 5542 may not be provided in the base 56. However, when the compressor 51, the condenser 52, and the expander 53 are about to be replaced together with the base 56 because of a reason such as failure, it is complicated to disconnect the third pipe 553 from and connect the third pipe 553 to the expander 53 and disconnect the fourth pipe 554 from and connect the fourth pipe 554 to the compressor 51.

Accordingly, the first partial pipe 5531 and the second partial pipe 5542 are provided in the base 56 and the first coupler 5533 and the second coupler 5543 are provided in the base 56. Consequently, when the compressor 51, the condenser 52, and the expander 53 are about to be replaced together with the base 56, the base 56 and the evaporator 54 can be separated by separating the second partial pipe 5532 and the first partial pipe 5531 provided in the base 56 and separating the first partial pipe 5541 and the second partial pipe 5542 provided in the base 56. The base 56 and the evaporator 54 can be connected by coupling the second partial pipe 5532 to the first partial pipe 5531 and coupling the first partial pipe 5541 to the second partial pipe 5542. Therefore, it is possible to easily carry out replacement work for the cooling device 5. That is, it is possible to improve maintainability and assemability of the cooling device 5.

The base main body 561 can also be formed of multilayer ceramic. In this case, the pipe through which the working fluid flows can also be formed on the inside of the base main body 561.

Effects of the First Embodiment

The projector 1A according to this embodiment explained above achieves the following effects.

The projector 1A modulates the light emitted from the light source 411 with the light modulating device 343 and projects the modulated light with the projection optical device 36. The projector 1A includes the cooling target CT, which is the first cooling target, the cooling device 5 that cools the cooling target CT, and the exterior housing 2 that houses the cooling target CT and the cooling device 5.

The cooling device 5 includes the compressor 51 functioning as the first compressor, the condenser 52, the expander 53 functioning as the first expander and the evaporator 54 functioning as the first evaporator, the first pipe 551, the second pipe 552, and the base 56.

The compressor 51 compresses the working fluid in the gas phase.

The condenser 52 is connected to the compressor 51 and condenses the working fluid in the gas phase compressed by the compressor 51 into the working fluid in the liquid phase.

The expander 53 is connected to the condenser 52 and decompresses the working fluid in the liquid phase condensed by the condenser 52 and changes a state of the working fluid to a mixed state of the liquid phase and the gas phase.

The evaporator 54 is connected to the expander 53 and changes the working fluid flowing into the evaporator 54 from the expander 53 to the working fluid in the gas phase with the heat transferred from the cooling target CT and discharges the changed gas-phase working fluid to the compressor 51.

The first pipe 551 connects the compressor 51 and the condenser 52.

The second pipe 552 connects the condenser 52 and the expander 53.

The compressor 51, the condenser 52, and the expander 53 are fixed to the base 56. The first pipe 551 and the second pipe 552 are provided in the base 56.

With such a configuration, the cooling device 5 is provided in the exterior housing 2 together with the cooling target CT. Consequently, setting of the projector 1A can be easily carried out compared with when a part of the cooling device 5 is provided on the outside of the exterior housing 2. The exterior of the projector 1A can be made satisfactory and the projector 1A can be configured small. The projector 1A can be easily moved.

Further, the compressor 51, the condenser 52, and the expander 53 are fixed to the base 56. Besides, the first pipe 551 connecting the compressor 51 and the condenser 52 and the second pipe 552 connecting the condenser 52 and the expander 53 are provided in the base 56. Consequently, after the compressor 51, the condenser 52, and the expander 53 are fixed to the base 56, it is unnecessary to separately provide the first pipe 551 connecting the compressor 51 and the condenser 52 and the second pipe 552 connecting the condenser 52 and the expander 53. Therefore, it is possible to simplify an assembly process for the cooling device 5.

The working fluid compressed by the compressor 51 flows through the first pipe 551. The working fluid condensed by the condenser 52 flows through the second pipe 552. That is, the working fluid having pressure higher than the pressure of the working fluid flowing in the other parts in the cooling device 5 flows through the first pipe 551 and the second pipe 552.

Accordingly, the first pipe 551 and the second pipe 552 are formed of metal.

With such a configuration, it is possible to cause the working fluid to stably flow through the first pipe 551 and the second pipe 552. Therefore, it is possible to stably circulate the working fluid in the cooling device 5.

The base main body 561, which is at least a part of the portions other than the first pipe 551 and the second pipe 552 in the base 56, is formed of a material other than metal.

When all of the portions other than the first pipe 551 and the second pipe 552 are formed of metal in the base 56, the base 56 tends to be heavy.

Accordingly, the base main body 561 is formed of a material other than metal.

Consequently, it is possible to achieve a reduction in the weight of the base 56 compared with when all of the portions other than the first pipe 551 and the second pipe 552 are formed of metal in the base 56. Therefore, it is possible to prevent the cooling device 5 from becoming heavy and prevent the projector 1A from becoming heavy.

The pressure of the working fluid discharged from the compressor 51 and flowing into the expander 53 via the first pipe 551, the condenser 52, and the second pipe 552 is higher than the pressure of the working fluid discharged from the expander 53 and flowing into the compressor 51 via the evaporator 54. The compressor 51, the condenser 52, and the expander 53 on the high-pressure side are fixed to the base 56.

With such a configuration, it is possible to unitize the components on the high-pressure side in the cooling device 5. Therefore, it is possible to simplify an assembly process for the cooling device 5 and make it easy to configure the cooling device 5 having durability against high pressure.

The cooling device 5 includes the third pipe 553 connecting the expander 53 and the evaporator 54 and the fourth pipe 554 connecting the evaporator 54 and the compressor 51.

The third pipe 553 includes the first partial pipe 5531, the second partial pipe 5532, and the first coupler 5533. The first partial pipe 5531 is equivalent to the first flow pipe and is connected to the outflow part 532 from which the working fluid flows out in the expander 53. The second partial pipe 5532 is equivalent to the first connection pipe and is connected to the inflow part 541 into which the working fluid flows in the evaporator 54. The first coupler 5533 separably couples the first partial pipe 5531 and the second partial pipe 5532 to each other.

The fourth pipe 554 includes the first partial pipe 5541, the second partial pipe 5542, and the second coupler 5543. The first partial pipe 5541 is equivalent to the second connection pipe and is connected to the outflow part 542 from which the working fluid flows out in the evaporator 54. The second partial pipe 5542 is equivalent to the second flow pipe and is connected to the inflow part 511 into which the working fluid flows in the compressor 51. The second coupler 5543 separably couples the first partial pipe 5541 and the second partial pipe 5542 to each other. The first partial pipe 5531 and the second partial pipe 5542 are provided in the base 56.

With such a configuration, the base 56 and the evaporator 54 can be separated by separating the first partial pipe 5531 and the second partial pipe 5532 provided in the base 56 and separating the second partial pipe 5542 and the first partial pipe 5541 provided in the base 56. The base 56 and the evaporator 54 can be connected by coupling the first partial pipe 5531 and the second partial pipe 5532 and coupling the second partial pipe 5542 and the first partial pipe 5541. Therefore, it is possible to easily carry out replacement work at the time when the cooling device 5 is replaced, replacement work for the evaporator 54, and replacement work for the cooling target CT. That is, it is possible to improve maintainability and assemability of the cooling device 5.

Second Embodiment

A second embodiment of the present disclosure is explained.

A projector according to this embodiment includes the same components as the components of the projector 1A according to the first embodiment and is different from the projector 1A in that the projector includes a second expander, a second evaporator, and a second compressor. In the following explanation, the same or substantially the same portions as the portions already explained above are denoted by the same reference numerals and signs and explanation of the portions is omitted.

Schematic Configuration of the Projector

Figure 5:
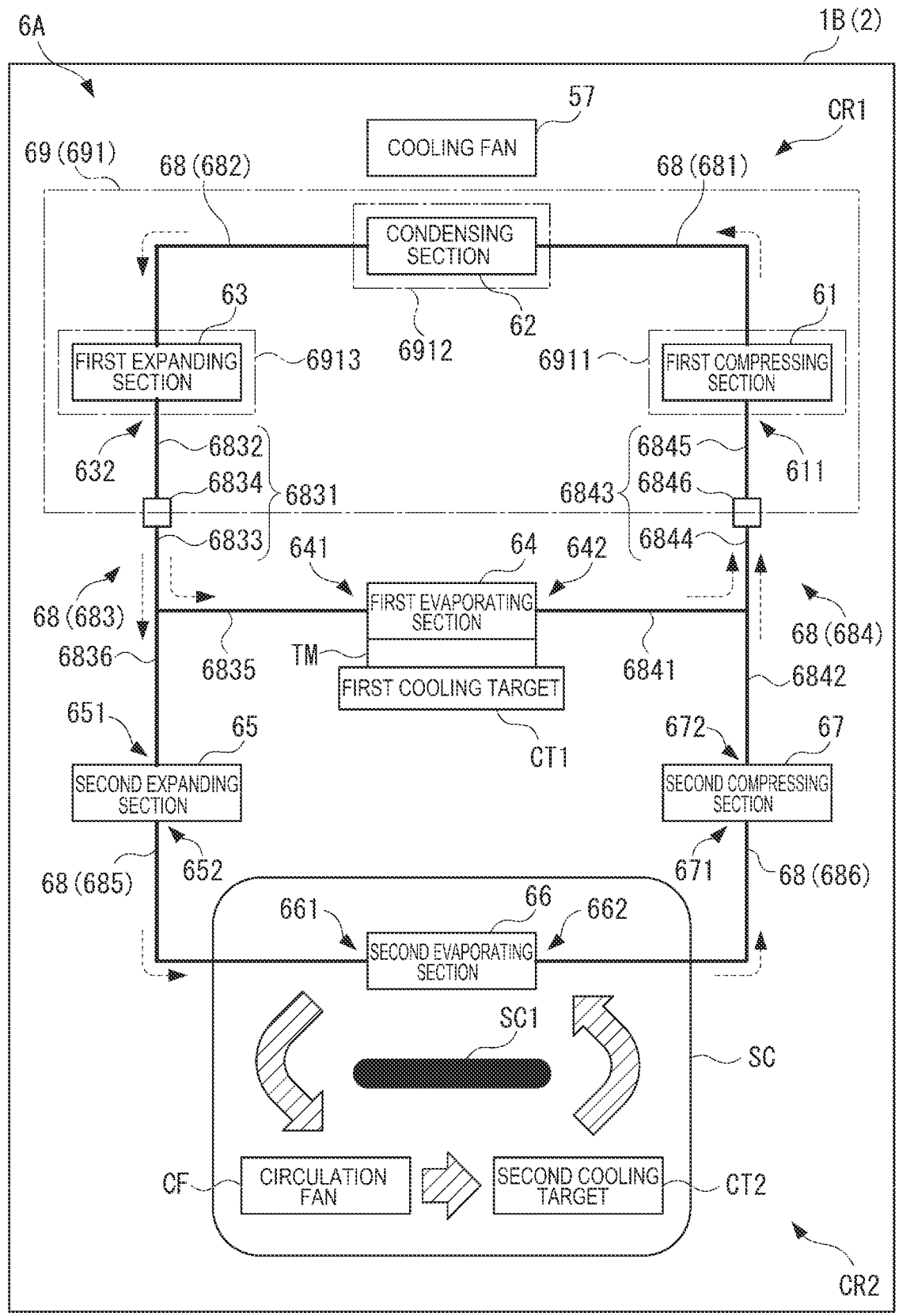
FIG. 5 is a schematic diagram showing the configuration of a cooling device included in a projector in a second embodiment.

FIG. 5 is a schematic diagram showing the configuration of a cooling device 6A included in a projector 1B according to this embodiment. In FIG. 5, a flowing direction of working fluid is indicated by dotted line arrows. A flowing direction of a cooling gas in a sealed housing SC is indicated by hatched arrows.

As shown in FIG. 5, the projector 1B according to this embodiment includes the cooling device 6A instead of the cooling device 5 according to the first embodiment and further includes the sealed housing SC and a circulation fan CF. Otherwise, the projector 1B includes the same components and the same functions as the components and the functions of the projector 1A according to the first embodiment.

The sealed housing SC houses, on the inside, the incident-side polarizing plate 342, the light modulating device 343, the viewing angle compensating plates 344, the emission-side polarizing plate 345, and the color combining section 346. The incident-side polarizing plate 342, the light modulating device 343, the viewing angle compensating plates 344, the emission-side polarizing plate 345, and the color combining section 346 are cooled by the cooling gas in the sealed housing SC circulated on the inside of the sealed housing SC. The circulation fan CF is disposed on the inside of the sealed housing SC and circulates the cooling gas in the sealed housing SC. The cooling gas in the sealed housing SC is cooled by a second evaporator 66 disposed in the sealed housing SC among the components of the cooling device 6A. The second evaporator 66 is explained in detail below.

Configuration of the Cooling Device

The cooling device 6A cools a cooling target like the cooling device 5. The cooling target cooled by the cooling device 6A includes a first cooling target CT1 and a second cooling target CT2. A management temperature range of the second cooling target CT2 is lower than a management temperature range of the first cooling target CT1. A lower limit value of a first temperature range may be lower than an upper limit value of a second temperature range. In this case, a median value of the first temperature range may be higher than a median value of the second temperature range.

In this embodiment, the first cooling target CT1 includes the light source 411 and the second cooling target CT2 includes the incident-side polarizing plate 342, the light modulating device 343, the viewing angle compensating plates 344, the emission-side polarizing plate 345, and the color combining section 346. In this embodiment, the second cooling target CT2 includes at least the light modulating device 343. However, the second cooling target CT2 may include at least the emission-side polarizing plate 345. That is, in this embodiment, the second cooling target CT2 is housed on the inside of the sealed housing SC together with the second evaporator 66.

The second cooling target CT2 is cooled by causing the cooling gas cooled by the second evaporator 66 to transfer heat. Therefore, it can be said that the second cooling target CT2 of the cooling device 6A is the light modulating device 343 and the like and a cooling target of the second evaporator 66 is the cooling gas.

The cooling device 6A includes a first compressor 61, a condenser 62, a first expander 63, a first evaporator 64, a second expander 65, a second evaporator 66, and a second compressor 67 and a plurality of pipes 68, on the inside of which the working fluid flows, a base 69, and the cooling fan 57.

Configuration of the Plurality of Pipes

The plurality of pipes 68 include a first pipe 681, a second pipe 682, a third pipe 683, a fourth pipe 684, a fifth pipe 685, and a sixth pipe 686.

Like the first pipe 551 according to the first embodiment, the first pipe 681 connects the first compressor 61 and the condenser 62. The second pipe 682 connects the condenser 62 and the first expander 63. The first pipe 681 and the second pipe 682 are formed of metal and provided in the base 69.

The fifth pipe 685 connects the second expander 65 and the second evaporator 66. The sixth pipe 686 connects the second evaporator 66 and the second compressor 67.

Configuration of the Third Pipe

The third pipe 683 connects the first expander 63 and the first evaporator 64 and connects the first expander 63 and the second expander 65. Third pipe 683 includes a flow dividing pipe 6831 and branch pipes 6835 and 6836.

The flow dividing pipe 6831 connects the first expander 63 and the branch pipes 6835 and 6836. The flow dividing pipe 6831 divides the working fluid flowing into the flow dividing pipe 6831 from the first expander 63 toward the first evaporator 64 and the second expander 65. The flow dividing pipe 6831 includes a first partial pipe 6832, a second partial pipe 6833, and a first coupler 6834.

The first partial pipe 6832 is connected to an outflow part 632 from which the working fluid flows out in the first expander 63.

The second partial pipe 6833 is connected to the branch pipes 6835 and 6836.

The first coupler 6834 separably couples the first partial pipe 6832 and the second partial pipe 6833 to each other. The first coupler 6834 can be configured by, for example, couplers provided in the first partial pipe 6832 and the second partial pipe 6833.

The branch pipe 6835 connects the second partial pipe 6833 and an inflow part 641 into which the working fluid flows in the first evaporator 64. The branch pipe 6835 causes a part of the working fluid divided in the flow dividing pipe 6831 to flow to the first evaporator 64.

The branch pipe 6836 connects the second partial pipe 6833 and an inflow part 651 into which the working fluid flows in the second expander 65. The branch pipe 6836 causes the other working fluid divided in the flow dividing pipe 6831 to flow to the second expander 65.

In the cooling device 6A, the first partial pipe 6832 is equivalent to the first flow pipe and the second partial pipe 6833 and the branch pipe 6835 are equivalent to the first connection pipe. The first partial pipe 6832 is provided in the base 69 explained below.

In the third pipe 683, the first partial pipe 6832 provided in the base 69 is formed of metal and the second partial pipe 6833 and the branch pipes 6835 and 6836 are formed of a material other than metal such as synthetic resin. However, not only this, but the entire third pipe 683 may be formed of metal or may be formed of a material other than metal.

The third pipe 683 is configured such that a flow rate of the working fluid flowing from the flow dividing pipe 6831 to the first evaporator 64 via the branch pipe 6835 is larger than a flow rate of the working fluid flowing from the flow dividing pipe 6831 to the second evaporator 66 via the branch pipe 6836 and the second expander 65. However, not only this, but a flow rate of the working fluid flowing to the branch pipe 6835 and a flow rate of the working fluid flowing to the branch pipe 6836 may be the same. The flow rate of the working fluid flowing to the branch pipe 6835 may be smaller than the flow rate of the working fluid flowing to the branch pipe 6836.

Configuration of the Fourth Pipe

The fourth pipe 684 connects the first evaporator 64 and the second compressor 67 and connects the first evaporator 64 and the first compressor 61. The fourth pipe 684 includes branch pipes 6841 and 6842 and a flow joining pipe 6843.

The branch pipe 6841 connects an outflow part 642 from which the working fluid flows out in the first evaporator 64 and the flow joining pipe 6843. The branch pipe 6841 causes the working fluid flowing from the first evaporator 64 to the branch pipe 6841 to flow to the flow joining pipe 6843.

The branch pipe 6842 connects an outflow part 672 from which the working fluid flows out in the second compressor 67 and the flow joining section 6843. The branch pipe 6842 causes the working fluid flowing from the second compressor 67 to the branch pipe 6842 to flow to the flow joining pipe 6843.

The flow joining pipe 6843 connects the branch pipes 6841 and 6842 and the first compressor 61. The flow joining pipe 6843 joins the working fluid flowing from the first evaporator 64 to the flow joining pipe 6843 via the branch pipe 6841 and the working fluid flowing from the second compressor 67 to the flow joining pipe 6843 via the branch pipe 6842 and causes the working fluid to flow to the first compressor 61. The flow joining pipe 6843 includes a first partial pipe 6844, a second partial pipe 6845, and a second coupler 6846.

The first partial pipe 6844 is connected to the branch pipes 6841 and 6842.

The second partial pipe 6845 is connected to an inflow part 611 into which the working fluid flows in the first compressor 61.

The second coupler 6846 separably couples the first partial pipe 6844 and the second partial pipe 6845 to each other. The second coupler 6846 can be configured by, for example, couplers provided in the first partial pipe 6844 and the second partial pipe 6845.

In the cooling device 6A, the branch pipe 6841 and the first partial pipe 6844 are equivalent to the second connection pipe and the second partial pipe 6845 is equivalent to the second flow pipe. The second partial pipe 6845 is provided in the base 69 explained below.

In the fourth pipe 684, the second partial pipe 6845 provided in the base 69 is formed of metal and the branch pipes 6841 and 6842 and the first partial pipe 6844 are formed of a material other than metal such as synthetic resin. However, not only this, but the entire fourth pipe 684 may be formed of metal or may be formed of a material other than metal.

Configuration of the First Compressor and the Condenser

Like the compressor 51 according to the first embodiment, the first compressor 61 raises the working fluid in the gas phase in temperature and pressure by compressing the working fluid in the gas phase flowing into the compressor 61 from the fourth pipe 684. The working fluid in the gas phase raised in temperature and pressure by the first compressor 61 flows to the condenser 62 via the first pipe 681. The first compressor 61 includes an inflow part 611 through which the working fluid flows into the inside of the first compressor 61 from the second partial pipe 6845 of the fourth pipe 684. The inflow part 611 is connected to the second partial pipe 6845.

The condenser 62 is connected to the first compressor 61 via the first pipe 681. Like the condenser 52 according to the first embodiment, the condenser 62 condenses the working fluid in the gas phase compressed by the first compressor 61, that is, the working fluid in the gas phase raised in temperature and pressure into the working fluid in the liquid phase.

Configuration of the First Expander

The first expander 63 is a decompressor and is connected to the condenser 62 via the second pipe 682. Like the expander 53 according to the first embodiment, the first expander 63 decompresses the working fluid in the liquid phase condensed by the condenser 62 and changes a state of the working fluid to a mixed state of the liquid phase and the gas phase. That is, the first expander 63 lowers the temperature of the working fluid. The first expander 63 can be configured by a capillary tube or an electronic expansion valve, more specifically, an electronic expansion valve like the expansion valve 53. The first expander 63 includes an outflow part 632 through which the working fluid flows out from the inside of the first expander 63 to the first partial pipe 6832 of the third pipe 683. The outflow part 632 is connected to the first partial pipe 6832.

Configuration of the First Evaporator

The first evaporator 64 is connected to the first expander 63 via the flow dividing pipe 6831 and the branch pipe 6835 configuring the third pipe 683. Apart of the working fluid in the mixed state of the liquid phase and the gas phase flows into the first evaporator 64 from the first expander 63. The first evaporator 64 includes the inflow part 641 through which the working fluid flows into the inside of the first evaporator 64 from the branch pipe 6835 of the third pipe 683 and the outflow part 642 through which the working fluid flows out from the inside of the first evaporator 64 to the branch pipe 6841 of the fourth pipe 684. The inflow part 641 is connected to the branch pipe 6835. The outflow part 642 is connected to the branch pipe 6841.

The first evaporator 64 is connected to the supporting member 414 of the light source 411, which is the first cooling target CT1, via the heat transferring member TM. Heat generated by the plurality of first semiconductor lasers 412 and the plurality of second semiconductor lasers 413 is transferred to the first evaporator 64 via the supporting member 414 and the heat transferring member TM.

The first evaporator 64 evaporates, with the heat transferred from the light source 411, a part of the working fluid, that is, the working fluid in the liquid phase flowing from the first expander 63 to the first evaporator 64 and changes the working fluid in the liquid phase to the working fluid in the gas phase. Consequently, the heat of the plurality of first semiconductor lasers 412 and the plurality of second semiconductor lasers 413 is consumed and the plurality of first semiconductor lasers 412 and the plurality of second semiconductor lasers 413 are cooled.

The first evaporator 64 discharges the changed gas-phase working fluid to the first compressor 61 via the branch pipe 6841 and the flow joining pipe 6843 configuring the fourth pipe 684.

In this way, the cooling device 6A includes a first circulation path CR1 of the working fluid that flows through the first compressor 61, the first pipe 681, the condenser 62, the second pipe 682, the first expander 63, the third pipe 683, the first evaporator 64, and the fourth pipe 684 in order and flows into the first compressor 61 again. As explained above, the first circulation path CR1 cools the light source 411, which is the first cooling target CT1.

Configuration of the Second Expander

The second expander 65 is the same decompressor as the first expander 63 according to the first embodiment. The second expander 65 is connected to the first expander 63 via the flow dividing pipe 6831 and the branch pipe 6836 configuring the third pipe 683. The other working fluid in the mixed state of the liquid phase and the gas phase flows into the second expander 65 from the first expander 63. The second expander 65 includes the inflow part 651 through which the working fluid flows into the inside of the second expander 65 from the branch pipe 6836 of the third pipe 683 and the outflow part 652 through which the working fluid flows out from the inside of the second expander 65 to the fifth pipe 685. The inflow part 651 is connected to the branch pipe 6836. The outflow part 652 is connected to the fifth pipe 685.

The second expander 65 further lowers the temperature of the working fluid by further decompressing the other working fluid flowing into the second expander 65 from the first expander 63 via the flow dividing pipe 6831 and the branch pipe 6836. As such a second expander 65, like the first expander 63, a capillary tube or an electronic expansion valve can be adopted.

When each of the first expander 63 and the second expander 65 is configured by an expansion valve, an opening degree of the expansion valve configuring the first expander 63 and an opening degree of the expansion valve configuring the second expander 65 can be individually adjusted. Accordingly, the temperature of the working fluid caused to flow out from the first expander 63 and the temperature of the working fluid caused to flow out from the second expander 65 can be individually adjusted.

Configuration of the Second Evaporator

The second evaporator 66 is connected to the second expander 65 via the fifth pipe 685. The working fluid decompressed by the second expander 65 flows into the second evaporator 66 via the fifth pipe 685. The second evaporator 66 includes an inflow part 661 through which the working fluid flows into the inside of the second evaporator 66 from the fifth pipe 685 and an outflow part 662 through which the working fluid flows out from the inside of the second evaporator 66 to the sixth pipe 686. The inflow part 661 is connected to the fifth pipe 685. The outflow part 662 is connected to the sixth pipe 686.

As explained above, the second evaporator 66 is provided in the sealed housing SC. The second evaporator 66 evaporates, with the heat of the cooling gas in the sealed housing SC received from at least one heat source in the second cooling target CT2, that is, the heat transferred from the second cooling target CT2, the working fluid in the liquid phase flowing into the second evaporator 66 from the second expander 65 and changes the working fluid in the liquid phase to the working fluid in the gas phase. Consequently, the cooling gas in the sealed housing SC is cooled and the second cooling target CT2 such as the light modulating device 343 is cooled. That is, the second evaporator 66 cools the cooling gas in the sealed housing SC and, as a result, cools the second cooling target CT2. The working fluid flowing from the second evaporator 66 to the second compressor 67 via the sixth pipe 686 is the working fluid in the gas phase.

A partition wall SC1 is provided in the sealed housing SC. The cooling gas cooled by the second evaporator 66 is circulated by the circulation fan CF in the sealed housing SC along an air circulation channel formed by the partition wall SC1. Consequently, the components, for example, the light modulating device 343 and the emission-side polarizing plate 345 of the image forming section 34 in the sealed housing SC are efficiently cooled by the cooling gas cooled by the second evaporator 66.

Configuration of the Second Compressor

The second compressor 67 is connected to the second evaporator 66 via the sixth pipe 686. The second compressor 67 is connected to the first compressor 61 via the fourth pipe 684. The second compressor 67 includes an inflow part 671 through which the working fluid flows into the inside of the second compressor 67 from the sixth pipe 686 and the outflow part 672 through which the working fluid flows out from the inside of the second compressor 67 to the branch pipe 6842 of the fourth pipe 684. The inflow part 671 is connected to the sixth pipe 686. The outflow part 672 is connected to the branch pipe 6842 of the fourth pipe 684.

The second compressor 67 compresses the working fluid in the gas phase flowing into the second compressor 67 from the second evaporator 66 via the sixth pipe 686. That is, the second compressor 67 raises the working fluid in the gas phase in temperature and pressure. The working fluid in the gas phase compressed by the second compressor 67 flows through the branch pipe 6842 of the fourth pipe 684, joins with, in the flow joining pipe 6843, the working fluid in the gas phase flowing through the branch pipe 6841, and flows to the first compressor 61. That is, the second compressor 67 discharges the compressed gas-phase working fluid to the first compressor 61 via the fourth pipe 684.

The second compressor 67 compresses the working fluid in the gas phase flowing into the second compressor 67 from the second evaporator 66 such that the pressure of the working fluid in the gas phase flowing into the branch pipe 6842 of the fourth pipe 684 from the second compressor 67 becomes substantially the same as the pressure of the working fluid in the gas phase flowing into the branch pipe 6841 of the fourth pipe 684 from the first evaporator 64. That is, the pressure of the working fluid in the gas phase compressed by the second compressor 67 is substantially the same as the pressure of the working fluid in the gas phase discharged from the first evaporator 64. Consequently, it is possible to allow the working fluid in the gas phase flowing through the branch pipe 6842 from the second compressor 67 and the working fluid in the gas phase flowing through the branch pipe 6841 from the first evaporator 64 to easily join in the flow joining pipe 6843 and flow to the first compressor 61.

A driving frequency of the second compressor 67 and a driving frequency of the first compressor 61 are substantially the same. Consequently, it is possible to prevent noise occurring in the compressors 61 and 67 from increasing at timing when phases of the driving frequencies coincide. The driving frequency of the first compressor 61 and the driving frequency of the second compressor 67 being substantially the same includes the driving frequencies being the same.

In this way, the cooling device 6A includes a second circulation path CR2 for the working fluid that flows through the first compressor 61, the first pipe 681, the condenser 62, the second pipe 682, the first expander 63, the flow dividing pipe 6831 and the branch pipe 6836 of the third pipe 683, the second expander 65, the fifth pipe 685, the second evaporator 66, the sixth pipe 686, the second compressor 67, and the branch pipe 6842 and the flow joining pipe 6843 of the fourth pipe 684 in order and flows into the first compressor 61 again. The second circulation path CR2 and the first circulation path CR1 share the path from the flow joining pipe 6843 of the fourth pipe 684 to the flow dividing pipe 6831 of the third pipe 683. As explained above, the second circulation path CR2 cools the second cooling target CT2 such as the light modulating device 343.

In this embodiment, a heat value of the first cooling target CT1 including the light source 411 is larger than a heat value of the second cooling target CT2 including the light modulating device 343. Accordingly, as explained above, the flow dividing pipe 6831 sets the flow rate of the working fluid in the liquid phase supplied to the first evaporator 64 via the branch pipe 6835 larger than the flow rate of the working fluid in the liquid phase supplied to the second evaporator 66 via the branch pipe 6836, the second expander 65, and the fifth pipe 685. Consequently, it is possible to more suitably cool the first cooling target CT1 having the heat value larger than the heat value of the second cooling target CT2. Therefore, it is possible to maintain the temperature of the second cooling target CT2 at temperature within the management temperature range of the second cooling target CT2 while maintaining the temperature of the first cooling target CT1 at temperature within the management temperature range of the first cooling target CT1.

As explained above, the cooling device 6A in this embodiment can cool the light source 411 by taking, with the first evaporator 64, the heat generated in the plurality of first semiconductor lasers 412 and the plurality of second semiconductor lasers 413. The cooling device 6A can cool the cooling gas by taking, with the second evaporator 66, heat of the cooling gas in the sealed housing SC and cool the image forming section 34 including the light modulating device 343. Therefore, the two first and second cooling targets CT1 and CT2 can be cooled by the one cooling device 6A.

Configuration of the Base

Like the base 56 according to the first embodiment, the base 69 is a member to which the first compressor 61, the condenser 62, and the first expander 63 are fixed and is a member including a part of the plurality of pipes 68. That is, the base 69 integrates the first compressor 61, the condenser 62, the first expander 63, and a part of the plurality of pipes 68.

The base 69 includes a base main body 691, the first pipe 681, the second pipe 682, the first partial pipe 6832 of the third pipe 683, and the second partial pipe 6845 of the fourth pipe 684. As in the first embodiment, the pipes including the first pipe 681, the second pipe 682, the first partial pipe 6832, and the second partial pipe 6845 provided in the base 69 may be channels formed by forming parts of the base main body 691 as hollows or may be pipes that are separate members from the base main body 691.

Like the base main body 561 according to the first embodiment, the base main body 691 is formed of a material other than metal such as synthetic resin. In other words, in the base 69, at least a part of portions other than the first pipe 681, the second pipe 682, the first partial pipe 6832, and the second partial pipe 6845 is formed of a material other than metal. The base main body 691 includes a first fixing section 6911 to which the first compressor 61 is fixed, a second fixing section 6912 to which the condenser 62 is fixed, and a third fixing section 6913 to which the first expander 63 is fixed.

In this embodiment, the first pipe 681 and the second pipe 682 are provided on the inside of the base main body 691. The first pipe 681 and the second pipe 682 are pipes through which high-pressure working fluid flows. That is, the pressure of the working fluid discharged from the first compressor 61 and flowing into the first expander 63 via the first pipe 681, the condenser 62, and the second pipe 682 is higher than the pressure of the working fluid discharged from the first expander 63 and flowing into the first compressor 61 via the first evaporator 64. The pressure of the working fluid discharged from the first compressor 61 and flowing into the first expander 63 via the first pipe 681, the condenser 62, and the second pipe 682 is higher than the pressure of the working fluid discharged from the first expander 63 and flowing into the first compressor 61 via the second expander 65, the second evaporator 66, and the second compressor 67. The first compressor 61, the condenser 62, and the first expander 63 on the high-pressure side are fixed to the base 69.

In the base main body 691, the first partial pipe 6832 of the third pipe 683 and the second partial pipe 6845 of the fourth pipe 684 are provided. Consequently, when the first compressor 61, the condenser 62, and the first expander 63 are about to be replaced together with the base 69, the first evaporator 64, the second expander 65, the second evaporator 66, and the second compressor 67 can be separated from the base 69 by separating the second partial pipe 6833 from the first partial pipe 6832 provided in the base 69 and separating the first partial pipe 6844 from the second partial pipe 6845 provided in the base 69. The first evaporator 64, the second expander 65, the second evaporator 66, and the second compressor 67 and the base 69 can be connected by coupling the second partial pipe 6833 to the first partial pipe 6832 and coupling the first partial pipe 6844 to the second partial pipe 6845. Therefore, it is possible to easily carry out replacement work for the cooling device 6A. That is, it is possible to improve maintainability and assemability of the cooling device 6A.

Like the base main body 561, the base main body 691 can be formed of multilayer ceramic.

Effects of the Second Embodiment

The projector 1B according to this embodiment explained above can achieve the same effects as the effects of the projector 1A according to the first embodiment. Besides, the projector 1B according to this embodiment achieves the following effects.

The projector 1B modulates the light emitted from the light source 411 with the light modulating device 343 and projects the modulated light with the projection optical device 36. The projector 1B includes the first cooling target CT1 and the second cooling target CT2, the cooling device 6A that cools the cooling targets CT1 and CT2, and the exterior housing 2 that houses the cooling targets CT1 and CT2 and the cooling device 6A.

The cooling device 6A includes the first compressor 61, the condenser 62, the first expander 63, and the first evaporator 64 and the first pipe 681, the second pipe 682, and the base 69.

The first compressor 61 compresses the working fluid in the gas phase.

The condenser 62 is connected to the first compressor 61 and condenses the working fluid in the gas phase compressed by the first compressor 61 into the working fluid in the liquid phase.

The first expander 63 is connected to the condenser 62 and decompresses the working fluid in the liquid phase condensed by the condenser 62 and changes the state of the working fluid to the mixed state of the liquid phase and the gas phase.

The first evaporator 64 is connected to the first expander 63 and changes the working fluid flowing from the first expander 63 to the first evaporator 64 to the working fluid in the gas phase with the heat transferred from the first cooling target CT1. The first evaporator 64 discharges the changed gas-phase working fluid to the first compressor 61.

The first pipe 681 connects the first compressor 61 and the condenser 62.

The second pipe 682 connects the condenser 62 and the first expander 63.

The first compressor 61, the condenser 62, and the first expander 63 are fixed to the base 69. The first pipe 681 and the second pipe 682 are provided in the base 69.

With such a configuration, since the cooling device 6A is provided in the exterior housing 2 together with the first cooling target CT1, it is possible to easily carry out setting of the projector 1B compared with when apart of the cooling device 6A is provided on the outside of the exterior housing 2. The exterior of the projector 1B can be made satisfactory and the projector 1B can be configured small. The projector 1B can be easily moved.

Further, the first compressor 61, the condenser 62, and the first expander 63 are fixed to the base 69. Besides, the first pipe 681 and the second pipe 682 are provided in the base 69. Consequently, after the first compressor 61, the condenser 62, and the first expander 63 are fixed to the base 69, it is unnecessary to separately provide the first pipe 681 connecting the first compressor 61 and the condenser 62 and the second pipe 682 connecting condenser 62 and the first expander 63. Therefore, it is possible to simplify an assembly process for the cooling device 6A.

The working fluid compressed by the first compressor 61 flows to the first pipe 681. The working fluid condensed by the condenser 62 flows to the second pipe 682. That is, the working fluid having higher pressure than the pressure of the working fluid flowing in the other parts in the cooling device 6A flows to the first pipe 681 and the second pipe 682.

In contrast, since the first pipe 681 and the second pipe 682 are formed of metal, it is possible to cause the working fluid to stably flow through the first pipe 681 and the second pipe 682. Therefore, it is possible to stably circulate the working fluid in the cooling device 6A.

The base main body 691, which is at least a part of the portions other than the first pipe 681 and the second pipe 682 in the base 69, is formed of a material other than metal.

When all of the portions other than the first pipe 681 and the second pipe 682 are formed of metal in the base 69, the base 69 tends to be heavy.

In contrast, the base main body 691 is formed of a material other than metal. Consequently, it is possible to achieve a reduction in the weight of the base 69 compared with when all of the portions other than the first pipe 681 and the second pipe 682 are formed of metal in the base 69. Therefore, it is possible to prevent the cooling device 6A from becoming heavy and prevent the projector 1B from becoming heavy.

The pressure of the working fluid discharged from the first compressor 61 and flowing into the first expander 63 via the first pipe 681, the condenser 62, and the second pipe 682 is higher than the pressure of the working fluid discharged from the first expander 63 and flowing into the first compressor 61 via the first evaporator 64. The pressure of the working fluid discharged from the first compressor 61 and flowing into the first expander 63 via the first pipe 681, the condenser 62, and the second pipe 682 is higher than the pressure of the working fluid discharged from the first expander 63 and flowing into the first compressor 61 via the second expander 65, the second evaporator 66, and the second compressor 67. The first compressor 61, the condenser 62, and the first expander 63 on the high-pressure side are fixed to the base 69.

With such a configuration, it is possible to unitize the components on the high-pressure side in the cooling device 6A. Therefore, it is possible to simplify an assembly process for the cooling device 6A and make it easy to configure the cooling device 6A having durability against high pressure.

The projector 1B includes the second cooling target CT2 housed in the exterior housing 2. The cooling device 6A includes the second expander 65, the second evaporator 66, and the second compressor 67.

The second expander 65 is connected to the first expander 63 and decompress the working fluid in the liquid phase flowing from the first expander 63 to the second expander 65.

The second evaporator 66 is connected to the second expander 65 and changes, with the heat transferred from the second cooling target CT2, the working fluid in the liquid phase flowing from the second expander 65 to the second evaporator 66 to the working fluid in the gas phase.

The second compressor 67 is connected to the first compressor 61 and the second evaporator 66 and compresses the working fluid in the gas phase flowing into the second compressor 67 from the second evaporator 66 and discharges the working fluid in the gas phase to the first compressor 61.

With such a configuration, the first cooling target CT1 and the second cooling target CT2 can be cooled by the one cooling device 6A. Accordingly, it is unnecessary to provide a cooling device for each cooling target. Besides, the first circulation path CR1 for cooling the first cooling target CT1 and the second circulation path CR2 for cooling the second cooling target CT2 can share the first compressor 61, the first pipe 681, the condenser 62, the second pipe 682, and the first expander 63. Therefore, the projector 1B including the cooling device 6A can be reduced in size.

The cooling device 6A includes the third pipe 683 connecting the first expander 63 and the first evaporator 64 and the fourth pipe 684 connecting the first evaporator 64 and the first compressor 61.

The third pipe 683 includes the flow dividing pipe 6831 including the first partial pipe 6832, the second partial pipe 6833, and the first coupler 6834 and the branch pipe 6835. The first partial pipe 6832 is equivalent to the first flow pipe and is connected to the outflow part 632 from which the working fluid flows out in the first expander 63. The second partial pipe 6833 and the branch pipe 6835 are equivalent to the first connection pipe and are connected to the inflow part 641 into which the working fluid flows in the first evaporator 64. The first coupler 6834 separably couples the first partial pipe 6832 configuring the first flow pipe and the second partial pipe 6833 and the branch pipe 6835 configuring the first connection pipe.

The fourth pipe 684 includes the branch pipe 6841 and the flow joining pipe 6843 including the first partial pipe 6844, the second partial pipe 6845, and the second coupler 6846. The branch pipe 6841 and the first partial pipe 6844 are equivalent to the second connection pipe and are connected to the outflow part 642 from which the working fluid flows out in the first evaporator 64. The second partial pipe 6845 is equivalent to the second flow pipe and is connected to the inflow part 611 into which the working fluid flows in the first compressor 61. The second coupler 6846 separably couples the branch pipe 6841 and the first partial pipe 6844 configuring the second connection pipe and the second partial pipe 6845 configuring the second flow pipe. The first partial pipe 6832 and the second partial pipe 6845 are provided in the base 69.

With such a configuration, the base 69 and the first evaporator 64 can be separated by separating the first partial pipe 6832 and the second partial pipe 6833 provided in the base 69 and separating the second partial pipe 6845 and the first partial pipe 6844 provided in the base 69. The base 69 and the first evaporator 64 can be connected by coupling the second partial pipe 6845 and the first partial pipe 6844 and coupling the second partial pipe 6845 and the first partial pipe 6844. Therefore, it is possible to easily carry out replacement work at the time the cooling device 6A is replaced, replacement work for the first evaporator 64, and replacement work for the first cooling target CT1. That is, it is possible to improve maintainability and assemability of the cooling device 6A.

Modifications of the Second Embodiment

In the cooling device 6A, the first partial pipe 6832 configuring the flow dividing pipe 6831 of the third pipe 683 is provided in the base 69 and the second partial pipe 6833 and the branch pipes 6835 and 6836 are provided on the outside of the base 69. In the cooling device 6A, the second partial pipe 6845 configuring the flow joining pipe 6843 of the fourth pipe 684 is provided in the base 69 and the branch pipes 6841 and 6842 and the first partial pipe 6844 are provided on the outside of the base 69. However, not only this, but parts provided in the base can be changed as appropriate in the third pipe and the fourth pipe.

Figure 6:
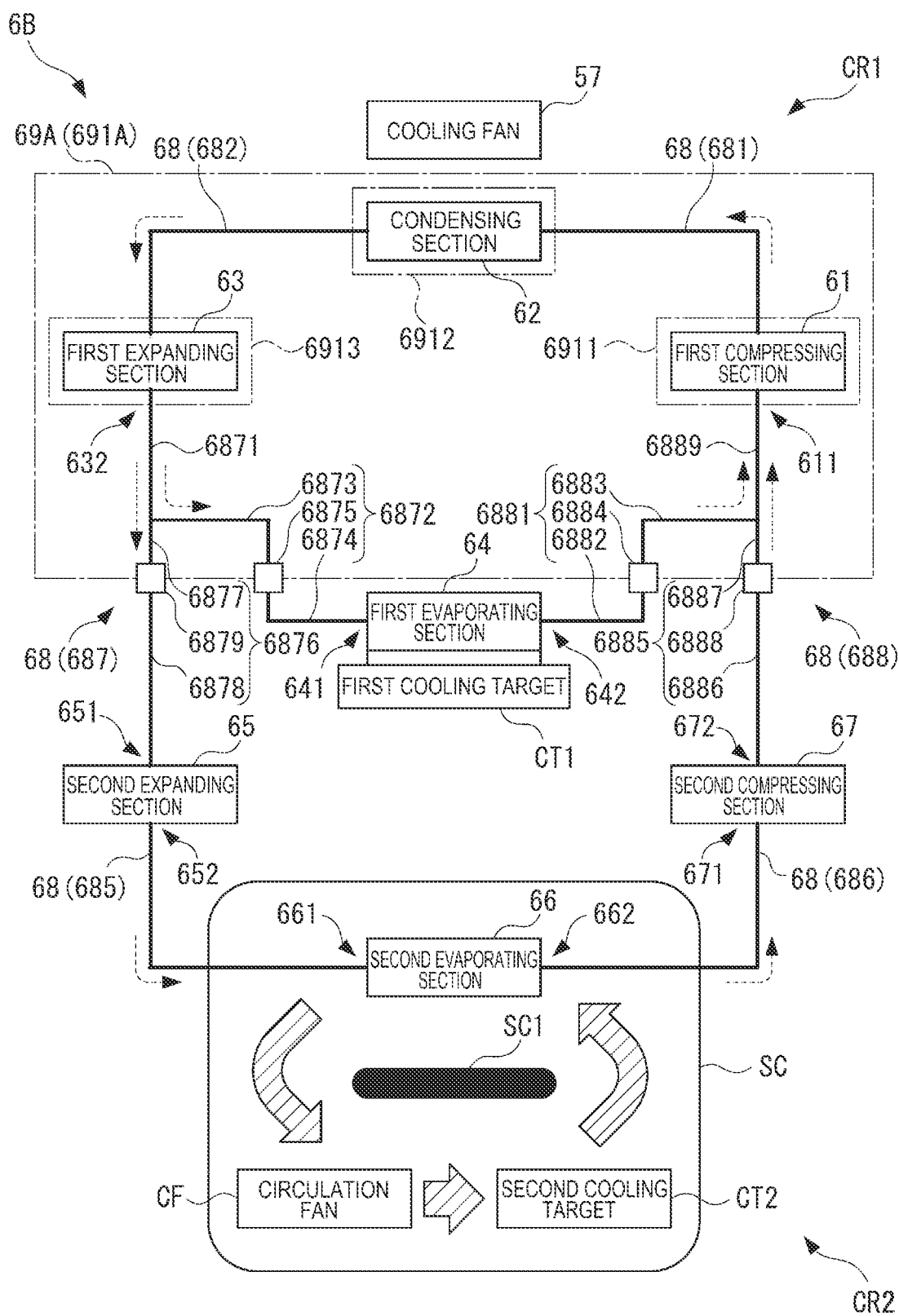
FIG. 6 is a schematic diagram showing a modification of the cooling device in the second embodiment.

FIG. 6 is a schematic diagram showing the configuration of a cooling device 6B, which is a modification of the cooling device 6A.

For example, the projector 1B may include the cooling device 6B shown in FIG. 6 instead of the cooling device 6A.

Like the cooling device 6A, the cooling device 6B is provided on the inside of the exterior housing 2 and cools the first cooling target CT1 and the second cooling target CT2. The cooling device 6B includes the same components and the same functions as the components and the functions of the cooling device 6A except that the cooling device 6B includes a third pipe 687, a fourth pipe 688, and a base 69A instead of the third pipe 683, the fourth pipe 684, and the base 69.

Configuration of the Third Pipe

The third pipe 687 connects the first expander 63 and the first evaporator 64 and connects the first expander 63 and the second expander 65 and divides the working fluid caused to flow out from the first expander 63 to the third pipe 687 toward the first evaporator 64 and the second expander 65. The third pipe 687 includes a flow dividing pipe 6871 and branch pipes 6872 and 6876.

The flow dividing pipe 6871 connects the outflow part 632 of the first expander 63 and the branch pipes 6872 and 6876. The flow dividing pipe 6871 divides the working fluid flowing into the inside of the flow dividing pipe 6871 from the first expander 63 toward the branch pipes 6872 and 6876.

The branch pipe 6872 connects the flow dividing pipe 6871 and the inflow part 641 of the first evaporator 64 and causes a part of the working fluid divided by the flow dividing pipe 6871 to flow to the first evaporator 64. The branch pipe 6872 includes a first partial pipe 6873, a second partial pipe 6874, and a first coupler 6875.

The first partial pipe 6873 is connected to the flow dividing pipe 6871.

The second partial pipe 6874 is connected to the inflow part 641 of the first evaporator 64.

The first coupler 6875 separably couples the first partial pipe 6873 and the second partial pipe 6874 to each other. The first coupler 6875 can be configured by, for example, couplers provided in the first partial pipe 6873 and the second partial pipe 6874.

In the cooling device 6B, the flow dividing pipe 6871 and the first partial pipe 6873 are equivalent to the first flow pipe and the second partial pipe 6874 is equivalent to the first connection pipe.

The branch pipe 6876 connects the flow dividing pipe 6871 and the inflow part 651 of the second expander 65 and causes the other working fluid divided by the flow dividing pipe 6871 to flow to the second expander 65. The branch pipe 6876 includes a first partial pipe 6877, a second partial pipe 6878, and a first coupler 6879.

The first partial pipe 6877 is connected to the flow dividing pipe 6871.

The second partial pipe 6878 is connected to the inflow part 651 of the second expander 65.

The first coupler 6879 separably couples the first partial pipe 6877 and the second partial pipe 6878. The first coupler 6879 is configured by, for example, couplers provided in the first partial pipe 6877 and the second partial pipe 6878.

In the cooling device 6B, the flow dividing pipe 6871, the first partial pipe 6873, and the first partial pipe 6877 are provided in the base 69 and the second partial pipe 6874 and the second partial pipe 6878 are provided on the outside of the base 69.

In the third pipe 687, the flow dividing pipe 6871, the first partial pipe 6873, and the first partial pipe 6877 provided in the base 69 are formed of metal and the second partial pipe 6874 and the second partial pipe 6878 are formed of a material other than metal such as synthetic resin. However, not only this, but the entire third pipe 687 may be formed of metal or may be formed of a material other than metal.

Configuration of the Fourth Pipe

The fourth pipe 688 connects the first evaporator 64 and the second compressor 67 and connects the first evaporator 64 and the first compressor 61 and causes the working fluid flowing out from the first evaporator 64 to the fourth pipe 688 and the working fluid flowing out from the second compressor 67 to the fourth pipe 688 to flow to the first compressor 61. The fourth pipe 688 includes branch pipes 6881 and 6885 and a flow joining pipe 6889.

The branch pipe 6881 connects the outflow part 642 of the first evaporator 64 and the flow joining pipe 6889. The branch pipe 6881 causes the working fluid caused to flow into the branch pipe 6881 from the first evaporator 64 to flow to the flow joining pipe 6889. The branch pipe 6881 includes a first partial pipe 6882, a second partial pipe 6883, and a second coupler 6884.

The first partial pipe 6882 is connected to the outflow part 642 of the first evaporator 64.

The second partial pipe 6883 is connected to the flow joining pipe 6889.

The second coupler 6884 separably couples the first partial pipe 6882 and the second partial pipe 6883 to each other. The second coupler 6884 can be configured by, for example, couplers provided in the first partial pipe 6882 and the second partial pipe 6883.

In the cooling device 6B, the first partial pipe 6882 is equivalent to the second connection pipe and the second partial pipe 6883 and the flow joining pipe 6889 are equivalent to the second flow pipe.

The branch pipe 6885 connects the outflow part 672 of the second compressor 67 and the flow joining pipe 6889. The branch pipe 6885 causes the working fluid caused to flow into the branch pipe 6885 from the second compressor 67 to flow to the flow joining pipe 6889. The branch pipe 6885 includes a first partial pipe 6886, a second partial pipe 6887, and a second coupler 6888.

The first partial pipe 6886 is connected to the outflow part 672 of the second compressor 67.

The second partial pipe 6887 is connected to the flow joining pipe 6889.

The second coupler 6888 separably couples the first partial pipe 6886 and the second partial pipe 6887 to each other. The second coupler 6888 can be configured by for example, couplers provided in the first partial pipe 6886 and the second partial pipe 6887.

The flow joining pipe 6889 connects the second partial pipe 6883 of the branch pipe 6881 and the inflow part 611 of the first compressor 61 and connects the second partial pipe 6887 of the branch pipe 6885 and the inflow part 611 of the first compressor 61. The flow joining pipe 6889 joins the working fluid flowing from the first evaporator 64 to the flow joining pipe 6889 via the branch pipe 6881 and the working fluid flowing from the second compressor 67 to the flow joining pipe 6889 via the branch pipe 6885 and causes the working fluid to flow to the first compressor 61.

In the cooling device 6B, the second partial pipe 6883, the second partial pipe 6887, and the flow joining pipe 6889 are provided in the base 69.

In the fourth pipe 688, the second partial pipe 6883, the second partial pipe 6887, and the flow joining pipe 6889 provided in the base 69 are formed of metal and the first partial pipe 6882 and the first partial pipe 6886 are formed of a material other than metal such as synthetic resin. However, not only this, but the entire fourth pipe 688 may be formed of metal or may be formed of a material other than metal.

Configuration of the Base

Like the base 69, the base 69A is a member to which the first compressor 61, the condenser 62, and the first expander 63 are fixed and is a member including a part of the plurality of pipes 68.

The base 69A includes a base main body 691A, the first pipe 681, the second pipe 682, the flow dividing pipe 6871, the first partial pipe 6873, and the first partial pipe 6877 of the third pipe 687, and the second partial pipe 6883, the second partial pipe 6887, and the flow joining pipe 6889 of the fourth pipe 688.

Like the base main body 691, the base main body 691A is formed of a material other than metal such as synthetic resin. In other words, in the base 69A, at least a part of portions other than the pipes including the first pipe 681, the second pipe 682, the flow dividing pipe 6871, the first partial pipe 6873, and the first partial pipe 6877, and the second partial pipe 6883, the second partial pipe 6887, and the flow joining pipe 6889 is formed of a material other than metal. The base main body 691A includes the first fixing section 6911 to which the first compressor 61 is fixed, the second fixing section 6912 to which the condenser 62 is fixed, and the third fixing section 6913 to which the first expander 63 is fixed.

In this embodiment, the first pipe 681 and the second pipe 682 are provided on the inside of the base main body 691A. In the base main body 691A, the flow dividing pipe 6871, the first partial pipe 6873, and the first partial pipe 6877 of the third pipe 687 and the second partial pipe 6883, the second partial pipe 6887, and the flow joining pipe 6889 of the fourth pipe 688 are provided. Consequently, as in the case of the base 69, it is possible to easily carry out replacement work for the cooling device 6B.

The projector 1B including such a cooling device 6B can achieve the same effects as the effects of the projector 1B including the cooling device 6A.

Third Embodiment

A third embodiment of the present disclosure is explained.

A projector according to this embodiment includes the same components as the components of the projector 1B according to the second embodiment. However, the projector is different from the projector 1B according to the second embodiment in that a second expander and a second compressor are fixed to a base. In the following explanation, the same or substantially the same portions as the portions already explained above are denoted by the same reference numerals and signs and explanation of the portions is omitted.

Schematic Configuration of the Projector

Figure 7:
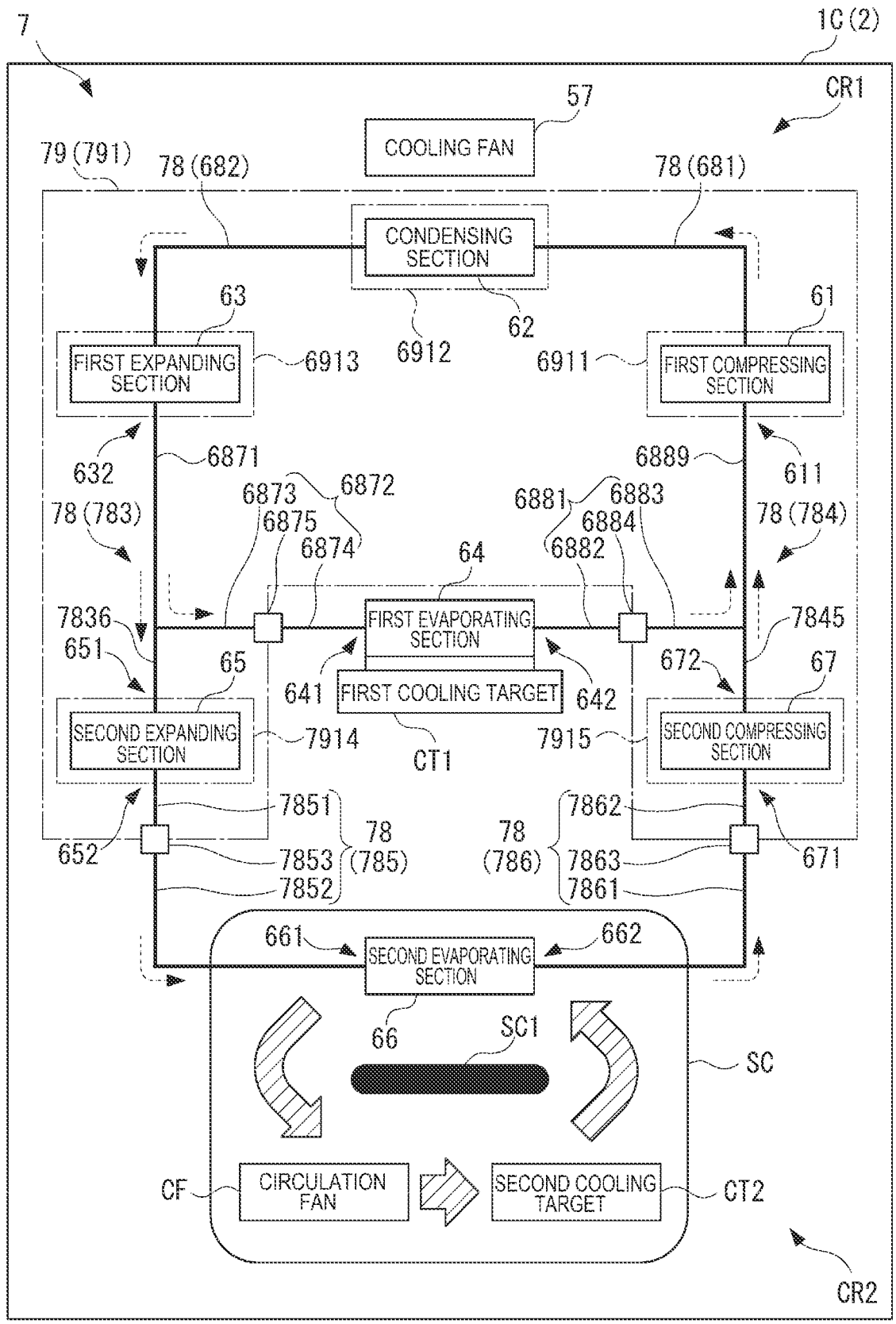
FIG. 7 is a schematic diagram showing the configuration of a cooling device included in a projector in a third embodiment.

FIG. 7 is a schematic diagram showing the configuration of a cooling device 7 included in a projector 1C according to this embodiment. In FIG. 7, a flowing direction of working fluid is indicated by dotted line arrows. A flowing direction of a cooling gas in the sealed housing SC is indicated by hatched arrows.

The projector 1C according to this embodiment includes the same components and the same functions as the components and the functions of the projector 1B according to the second embodiment except that the projector 1C includes the cooling device 7 shown in FIG. 7 instead of the cooling devices 6A and 6B according to the second embodiment.

Configuration of the Cooling Device

Like the cooling devices 6A and 6B, the cooling device 7 cools the first cooling target CT1 and the second cooling target CT2. The first cooling target CT1 and the second cooling target CT2 are the same as those in the case of the cooling devices 6A and 6B.

The cooling device 7 includes the first compressor 61, the condenser 62, the first expander 63, the first evaporator 64, the second expander 65, the second evaporator 66, and the second compressor 67 and a plurality of pipes 78, on the inside of which the working fluid flows, a base 79, and the cooling fan 57.

Configuration of the Plurality of Pipes

The plurality of pipes 78 include the first pipe 681, the second pipe 682, a third pipe 783, a fourth pipe 784, a fifth pipe 785, and a sixth pipe 786.

Configuration of the Third Pipe

The third pipe 783 connects the first expander 63 and the first evaporator 64 and connects the first expander 63 and the second expander 65, divides the working fluid flowing into the third pipe 783 from the first expander 63 to the first evaporator 64 and the second expander 65, and causes the working fluid to flow. The third pipe 783 includes the flow dividing pipe 6871 and the branch pipe 6872 and a branch pipe 7836.

As explained above, the flow dividing section 6871 is connected to the outflow part 632 of the first expander 63. The branch pipe 6872 includes the first partial pipe 6873 connected to the flow dividing pipe 6871, the second partial pipe 6874 connected to the inflow part 641 of the first evaporator 64, and the first coupler 6875 that separably couples the first partial pipe 6873 and the second partial pipe 6874 to each other.

The branch pipe 7836 connects the flow dividing pipe 6871 and the inflow part 651 of the second expander 65.

Among the components of the third pipe 783, the flow dividing pipe 6871, the first partial pipe 6873, and the branch pipe 7836 are provided in the base 79 explained below and the second partial pipe 6874 is provided on the outside of the base 79. The flow dividing pipe 6871, the first partial pipe 6873, and the branch pipe 7836 are formed of metal. The second partial pipe 6874 is formed of a material other than metal such as synthetic resin. However, not only this, but the entire third pipe 783 may be formed of metal or may be formed of a material other than metal.

In the cooling device 7, the flow dividing pipe 6871 and the first partial pipe 6873 are equivalent to the first flow pipe and the second partial pipe 6874 is equivalent to the first connection pipe.

Configuration of the Fourth Pipe

The fourth pipe 784 connects the first evaporator 64 and the first compressor 61 and connects the second compressor 67 and the first compressor 61 and causes the working fluid flowing out from the first evaporator 64 to the fourth pipe 784 and the working fluid flowing out from the second compressor 67 to the fourth pipe 784 to flow to the first compressor 61. The fourth pipe 784 includes the branch pipe 6881 and a branch pipe 7845 and the flow joining pipe 6889.

As explained above, the branch pipe 6881 includes the first partial pipe 6882 connected to the outflow part 642 of the first evaporator 64, the second partial pipe 6883 connected to the flow joining pipe 6889, and the second coupler 6884 that separably couples the first partial pipe 6882 and the second partial pipe 6883.

The branch pipe 7845 connects the outflow part 672 of the second compressor 67 and the flow joining pipe 6889.

The flow joining pipe 6889 connects the second partial pipe 6883 and the inflow part 611 of the first compressor 61 and connects the branch pipe 7845 and the inflow part 611 of the first compressor 61.

Among the components of the fourth pipe 784, the second partial pipe 6883, the branch pipe 7845, and the flow joining pipe 6889 are provided in the base 79 explained below and the first partial pipe 6882 is provided on the outside of the base 79. The second partial pipe 6883, the branch pipe 7845, and the flow joining pipe 6889 are formed of metal and the first partial pipe 6882 is formed of a material other than metal such as synthetic resin. However, not only this, but the entire fourth pipe 784 may be formed of metal or may be formed of a material other than metal.

In the cooling device 7, the first partial pipe 6882 is equivalent to the second connection pipe and the second partial pipe 6883 and the flow joining pipe 6889 are equivalent to the second flow pipe.

Configuration of the Fifth Pipe

Like the fifth pipe 685 according to the second embodiment, the fifth pipe 785 connects the second expander 65 and the second evaporator 66 and causes the working fluid flowing out from the second expander 65 to the fifth pipe 785 to flow to the second evaporator 66. The fifth pipe 785 includes a first partial pipe 7851, a second partial pipe 7852, and a coupler 7853.

The first partial pipe 7851 is connected to the outflow part 652 of the second expander 65.

The second partial pipe 7852 is connected to the inflow part 661 of the second evaporator 66.

The coupler 7853 separably couples the first partial pipe 7851 and the second partial pipe 7852 to each other. The coupler 7853 can be configured by, for example, couplers provided in the first partial pipe 7851 and the second partial pipe 7852.

Among the components of the fifth pipe 785, the first partial pipe 7851 is provided in the base 79 explained below and the second partial pipe 7852 is provided on the outside of the base 79. The first partial pipe 7851 is formed of metal and the second partial pipe 7852 is formed of a material other than metal such as synthetic resin. However, not only this, but the entire fifth pipe 785 may be formed of metal or may be formed of a material other than metal.

In the cooling device 7, the first partial pipe 7851 is equivalent to the third flow pipe and the second partial pipe 7852 is equivalent to the third connection pipe.

Configuration of the Sixth Pipe

Like the sixth pipe 686 according to the second embodiment, the sixth pipe 786 connects the second evaporator 66 and the second compressor 67 and causes the working fluid flowing out from the second evaporator 66 to the sixth pipe 786 to flow to the second compressor 67. The sixth pipe 786 includes a first partial pipe 7861, a second partial pipe 7862, and a coupler 7863.

The first partial pipe 7861 is connected to the outflow part 662 of the second evaporator 66.

The second partial pipe 7862 is connected to the inflow part 671 of the second compressor 67.

The coupler 7863 separably couples the first partial pipe 7861 and the second partial pipe 7862 to each other. The coupler 7863 can be configured by, for example, couplers provided in the first partial pipe 7861 and the second partial pipe 7862.

Among the components of the sixth pipe 786, the first partial pipe 7861 is provided on the outside of the base 79 explained below and the second partial pipe 7862 is provided in the base 79. The first partial pipe 7861 is formed of a material other than metal such as synthetic resin. The second partial pipe 7862 is formed of metal. However, not only this, but the entire sixth pipe 786 may be formed of metal or may be formed of a material other than metal.

In the cooling device 7, the first partial pipe 7861 is equivalent to the fourth connection pipe and the second partial pipe 7862 is equivalent to the fourth flow pipe.

Configuration of the Base

Like the bases 69 and 69A according to the second embodiment, the base 79 is a member to which the first compressor 61, the condenser 62, and the first expander 63 are fixed and is a member including a part of the plurality of pipes 68. Further, the second expander 65 and the second compressor 67 are fixed to the base 79.

The base 79 includes a base main body 791, the first pipe 681, the second pipe 682, the flow dividing pipe 6871, the first partial pipe 6873, and the branch pipe 7836 of the third pipe 783, the second partial pipe 6883, the branch pipe 7845, and the flow joining pipe 6889 of the fourth pipe 784, the first partial pipe 7851 of the fifth pipe 785, and the second partial pipe 7862 of the sixth pipe 786. As in the embodiments explained above, the pipes provided in the base 79 may be channels formed by forming parts of the base main body 791 as hollows or may be pipes that are separate members from the base main body 791.

Like the base main bodies 691 and 691A according to the second embodiment, the base main body 791 is formed of a material other than metal such as synthetic resin. In other words, in the base 79, at least a part of portions other than the pipes is formed of a material other than metal. The base main body 791 includes the first fixing section 6911 to which the first compressor 61 is fixed, the second fixing section 6912 to which the condenser 62 is fixed, the third fixing section 6913 to which the first expander 63 is fixed, a fourth fixing section 7914 to which the second expander 65 is fixed, and a second compressor 7915.

In this embodiment, the first pipe 681 and the second pipe 682 are provided on the inside of the base main body 791.

In the base main body 791, the flow dividing pipe 6871, the first partial pipe 6873, and the branch pipe 7836 of the third pipe 783, the second partial pipe 6883, the branch pipe 7845, and the flow joining pipe 6889 of the fourth pipe 784, the first partial pipe 7851 of the fifth pipe 785, and the second partial pipe 7862 of the sixth pipe 786 are provided. Consequently, as in the case of the bases 69 and 69A, it is possible to easily carry out replacement work for the cooling device 7.

Effects of the Third Embodiment

The projector 1C including such a cooling device 7 can achieve the same effects as the effects of the projectors 1A and 1B according to the first and second embodiments. Besides, the projector 1C achieves the following effects.

The second expander 65 and the second compressor 67 are fixed to the base 79.

With such a configuration, in the cooling device 7, the components other than the first evaporator 64 provided according to the first cooling target CT1 and the second evaporator 66 provided according to the second cooling target CT2, that is, the first compressor 61, the condenser 62, the first expander 63, the second expander 65, and the second compressor 67 can be fixed to the base 79. Consequently, the cooling device 7 can be easily assembled. Besides, the cooling device 7 can be configured small.

Modifications of the Embodiments

The present disclosure is not limited to the embodiments. Modifications, improvements, and the like in a range in which the object of the present disclosure can be achieved are included in the present disclosure.

In the first embodiment, the light source 411, the wavelength conversion element 46, the light modulating device 343, and the like are described as the examples of the first cooling target CT1. In the second and third embodiments, the light source 411 is described as the example of the first cooling target CT1 and the light modulating device 343 and the like are described as the examples of the second cooling target CT2. However, not only this, but cooling targets of the cooling devices 5, 6A, 6B, and 7 may be other components such as a power supply device and a control device.

In the embodiments, in the plurality of pipes 55, 68, and 78, the pipes other than the first pipes 551 and 681 and the second pipes 552 and 682 are also provided in the bases 56, 69, 69A, and 79. However, not only this, but, in the plurality of pipes 55, 68, and 78 included in the cooling devices, if at least the first pipes 551 and 681 and the second pipes 552 and 682 are provided in the bases 56, 69, 69A, and 79, the other pipes may not be provided in the bases 56, 69, 69A.

In the embodiments, the first pipes 551 and 681 and the second pipes 552 and 682 are formed of metal. However, not only this, but the first pipes 551 and 681 and the second pipes 552 and 682 may be formed of a material other than metal.

In the embodiments, the base main bodies 561, 691, 691A, and 791 of the bases 56, 69, 69A, and 79 are formed of a material other than metal. However, not only this, but the base main bodies 561, 691, 691A, and 791 may be formed of metal. In this case, channels functioning as the first pipes 551 and 681 and the second pipes 552 and 682 may be formed in the base main bodies 561, 691, 691A, and 791.

In the third embodiment, the second expander 65 and the second compressor 67 are fixed to the base main body 791. However, not only this, but at least one of the second expander 65 and the second compressor 67 may not be fixed to the base main body 791.

In the second and third embodiments, the second cooling target CT2 is housed in the sealed housing SC together with the second evaporator 66 and the circulation fan CF. However, not only this, but the second cooling target CT2 may not always be housed in the sealed housing SC. That is, the projectors 1B and 1C may not include the sealed housing SC in which the second cooling target CT2 is housed. The circulation fan CF housed on the inside of the sealed housing SC may be absent.

In the embodiments, the cooling devices 5, 6A, 6B, and 7 include the cooling fan 57 that circulates the cooling gas to the condenser 52. However, not only this, but the cooling fan 57 may be absent.

In the embodiments, the projectors 1A, 1B, and 1C include the image projecting device 3 shown in FIG. 2 and the image projecting device 3 includes the light source device 4 shown in FIG. 3. However, not only this, but the configurations and the layouts of the optical components included in the image projecting device 3 can be changed as appropriate and the configurations and the layouts of the optical components included in the light source device 4 can be changed as appropriate. For example, the wavelength conversion element 46 included in the light source device 4 is a reflection-type wavelength conversion element that emits the fluorescent light YL generated by the wavelength converting section 461 to the incident side of the blue light L1s. However, a transmission-type wavelength conversion element that emits fluorescent light along an incident direction of the blue light L1s may be adopted in the light source device.

In the embodiments, the light source 411 of the light source device 4 includes the semiconductor lasers 412 and 413. However, not only this, but the light source device 4 may include, as light sources, light source lamps such as an ultrahigh pressure mercury lamp or other solid-state light sources such an LED. The light source device 4 may include, as the light sources, other solid-state light sources such as LDs or LEDs or light source lamps that respectively emit red, green, and blue lights. In this case, the cooling targets of the cooling devices 5, 6A, 6B, and 7 may be the other solid-state light sources or the light source lamps.

In the embodiments, the projectors 1A, 1B, and 1C include the three light modulating devices 343 (343B, 343G, and 343R). However, not only this, but the present disclosure is also applicable to a projector including two or less or four or more light modulating devices.

In the embodiments, the light modulating device 343 is the transmission-type liquid crystal panel, a light incident surface and a light emission surface of which are different. However, not only this, but, as the light modulating device, a reflection-type liquid crystal panel, a light incident surface and a light emission surface of which are the same, may be used. A light modulating device other than the liquid crystal panel such as a light modulating device that makes use of a device including a micromirror, for example, a DMD (Digital Micromirror Device) may be used if the light modulating device is a light modulating device capable of modulating an incident light beam and forming an image corresponding to image information.

Overview of the Present Disclosure

An overview of the present disclosure is appended below.

According to an aspect of the present disclosure, there is provided a projector that modulates and projects light emitted from a light source, the projector including: a first cooling target; a cooling device configured to cool the first cooling target; and an exterior housing configured to house the first cooling target and the cooling device. The cooling device includes: a first compressor configured to compress working fluid in a gas phase; a condenser connected to the first compressor and configured to condense the working fluid in the gas phase compressed by the first compressor into the working fluid in a liquid phase; a first expander connected to the condenser and configured to decompress the working fluid in the liquid phase condensed by the condenser and change the working fluid in the liquid phase to the working fluid in a mixed phase of the liquid phase and the gas phase; a first evaporator connected to the first expander and configured to change the working fluid caused to flow into the first evaporator from the first expander to the working fluid in the gas phase with heat transferred from the first cooling target and discharge the changed gas-phase working fluid to the first compressor; a first pipe connecting the first compressor and the condenser; a second pipe connecting the condenser and the first expander; and a base to which the first compressor, the condenser, and the first expander are fixed. The first pipe and the second pipe are provided in the base.

With such a configuration, since the cooling device is provided in the exterior housing together with the first cooling target, it is possible to easily carry out setting of the projector compared with when a part of the cooling device is provided on the outside of the exterior housing. The exterior of the projector can be made satisfactory and the projector can be configured small. The projector can be easily moved.

Further, the first compressor, the condenser, and the first expander are fixed to the base. Besides, the first pipe connecting the first compressor and the condenser and the second pipe connecting the condenser and the first expander are provided in the base. Consequently, after the first compressor, the condenser, and the first expander are fixed to the base, it is unnecessary to separately provide the first pipe connecting the first compressor and the condenser and the second pipe connecting the condenser and the first expander. Therefore, it is possible to simplify an assembly process for the cooling device.

In the aspect, the first pipe and the second pipe may be formed of metal.

The working fluid compressed by the first compressor flows to the first pipe. The working fluid condensed by the condenser flows to the second pipe. That is, the working fluid having pressure higher than the pressure of the working fluid flowing in other parts in the cooling device flows to the first pipe and the second pipe.

In contrast, with the configuration explained above, since the first pipe and the second pipe are formed of metal, it is possible to cause the working fluid to stably flow to the first pipe and the second pipe. Therefore, it is possible to stably circulate the working fluid in the cooling device.

In the aspect, at least a part of portions other than the first pipe and the second pipe in the base may be formed of a material other than metal.

When all of the portions other than the first pipe and the second pipe in the base are formed of metal, the base tends to be heavy.

In contrast, with the configuration explained above, it is possible to achieve a reduction in the weight of the base compared with when all of the portions other than the first pipe and the second pipe in the base are formed of metal. Therefore, it is possible to prevent the cooling device from becoming heavy and prevent the projector from becoming heavy.

When a base main body is formed of multilayer ceramic, a channel through which the working fluid flows can be formed on the inside of the base main body.

In the aspect, pressure of the working fluid discharged from the first compressor and flowing into the first expander via the first pipe, the condenser, and the second pipe may be higher than pressure of the working fluid discharged from the first expander and flowing into the first compressor via the first evaporator, and the first compressor, the condenser, and the first expander on a high-pressure side may be fixed to the base.

With such a configuration, it is possible to unitize the components on the high-pressure side in the cooling device. Therefore, it is possible to simplify an assembly process for the cooling device and make it easy to configure the cooling device having durability against high pressure.

In the aspect, the projector may further include a second cooling target housed in the exterior housing, and the cooling device may include: a second expander connected to the first expander and configured to decompress the working fluid in the liquid phase flowing from the first expander to the second expander; a second evaporator connected to the second expander and configured to change, with heat transferred from the second cooling target, the working fluid in the liquid phase flowing from the second expander to the second evaporator to the working fluid in the gas phase; and a second compressor connected to the first compressor and the second evaporator and configured to compress the working fluid in the gas phase flowing into the second compressor from the second evaporator and discharge the working fluid in the gas phase to the first compressor.

With such a configuration, the first cooling target and the second cooling target can be cooled by the one cooling device. Accordingly, it is unnecessary to provide a cooling device for each cooling target. Besides, the first circulation path for cooling the first cooling target and the second circulation path for cooling the second cooling target can share the first compressor, the first pipe, the condenser, the second pipe, and the first expander. Therefore, the projector including the cooling device can be reduced in size.

In the aspect, the second expander and the second compressor may be fixed to the base.

With such a configuration, in the cooling device, the components other than the first evaporator and the second evaporator provided according to the cooling target, that is, the first compressor, the condenser, the first expander, the second expander, and the second compressor can be fixed to the base. Consequently, the cooling device can be easily assembled. Besides, the cooling device can be configured small.

In the aspect, the cooling device may include: a third pipe connecting the first expander and the first evaporator; and a fourth pipe connecting the first evaporator and the first compressor, the third pipe may include: a first flow pipe connected to an outflow part from which the working fluid flows out in the first expander; a first connection pipe connected to an inflow part into which the working fluid flows in the first evaporator; and a first coupler that separably couples the first flow pipe and the first connection pipe to each other, the fourth pipe may include: a second connection pipe connected to an outflow part from which the working fluid flows out in the first evaporator; a second flow pipe connected to an inflow part into which the working fluid flows in the first compressor; and a second coupler that separably couples the second connection pipe and the second flow pipe to each other, and the first flow pipe and the second flow pipe may be provided in the base.

With such a configuration, the base and the first evaporator can be separated by separating the first flow pipe and the first connection pipe provided in the base and separating the second flow pipe and the second connection pipe provided in the base. The base and the first evaporator can be connected by coupling the first flow pipe and the first connection pipe and coupling the second flow pipe and the second connection pipe. Therefore, it is possible to easily carry out replacement work at the time when the cooling device is replaced, replacement work for the first evaporator, and replacement work for the first cooling target. That is, it is possible to improve maintainability and assemability of the cooling device.

What is claimed is:

1. A projector that modulates and projects light emitted from a light source, the projector comprising:
    a first cooling target comprising a component configuring the projector;
    a cooling device configured to cool the first cooling target; and
    an exterior housing accommodating the first cooling target and the cooling device, wherein
    the cooling device includes:
        a first compressor configured to compress working fluid in a gas phase;
        a condenser connected to the first compressor and configured to condense the working fluid in the gas phase compressed by the first compressor into the working fluid in a liquid phase;
        a first expander connected to the condenser and configured to decompress the working fluid in the liquid phase condensed by the condenser, the first expander being configured to change the working fluid in the liquid phase to the working fluid in a mixed phase of the liquid phase and the gas phase;
        a first evaporator connected to the first expander and configured to change the working fluid flowed from the first expander to the working fluid in the gas phase with heat transferred from the first cooling target, the first evaporator being configured to discharge the changed gas-phase working fluid to the first compressor;
        a first pipe connecting the first compressor and the condenser;
        a second pipe connecting the condenser and the first expander; and
        a base to which the first compressor, the condenser, and the first expander are fixed inside of the base,
    the first evaporator is provided outside of the base, and
    the first pipe and the second pipe are provided entirely in the base and are formed of metal,
    wherein at least a part of portions other than the first pipe and the second pipe in the base is formed of a material other than metal; and further comprising
    a first partial pipe inside of the base and connected between the first expander and a first coupler provided in the base and facing for connection outside of the base to the first evaporator; and
    a second partial pipe inside of the base and connected between the first compressor and a second coupler provided in the base and facing for connection outside of the base to the first evaporator, whereby the base and its contents may be disconnected at the first coupler and the second coupler from the first evaporator.

2. The projector according to claim 1, wherein
    a first pressure of the working fluid which is discharged from the first compressor and flowing into the first expander via the first pipe, the condenser, and the second pipe is higher than a second pressure of the working fluid which is discharged from the first expander and flowing into the first compressor via the first evaporator, and the first compressor, the condenser, and the first expander on a high-pressure side are fixed to the base.

3. The projector according to claim 1, further comprising:

a second cooling target housed in the exterior housing, the second cooling target comprising another component configuring the projector, wherein the cooling device includes:
- a second expander connected to the first expander and configured to decompress the working fluid in the liquid phase flowing from the first expander;
- a second evaporator connected to the second expander and configured to change, with heat transferred from the second cooling target, the working fluid in the liquid phase flowing from the second expander to the working fluid in the gas phase; and
- a second compressor connected to the first compressor and the second evaporator and configured to compress the working fluid in the gas phase flowing from the second evaporator, the second compressor being configured to discharge the working fluid in the gas phase to the first compressor.

4. The projector according to claim 3, wherein the second expander and the second compressor are fixed to the base.

5. The projector according to claim 1, wherein the cooling device includes a third pipe connecting the first expander and the first evaporator and a fourth pipe connecting the first evaporator and the first compressor, the third pipe includes:
- a first flow pipe comprising the first partial pipe inside the base and connected to an outflow part from which the working fluid flows out in the first expander;
- a first connection pipe connected to an inflow part into which the working fluid flows in the first evaporator; and
- the first coupler separably coupling the first flow pipe and the first connection pipe to each other, the fourth pipe includes:
- a second connection pipe connected to an outflow part from which the working fluid flows out in the first evaporator;
- a second flow pipe comprising the second partial pipe inside the base and connected to an inflow part into which the working fluid flows in the first compressor; and
- the second coupler separably coupling the second connection pipe and the second flow pipe to each other.

6. The projector according to claim 5, wherein the first connection pipe and the second connection pipe are provided outside of the base.

* * * * *